United States Patent
Miros et al.

(10) Patent No.: US 11,639,815 B2
(45) Date of Patent: May 2, 2023

(54) PORTABLE REFRIGERATOR AND METHOD OF USING

(71) Applicant: Stone Cold Systems, Inc., San Rafael, CA (US)

(72) Inventors: Robert H. J. Miros, Fairfax, CA (US); Keith B. Payea, Santa Rosa, CA (US); James A. McCrea, San Carlos, CA (US)

(73) Assignee: Stone Cold Systems, Inc., San Rafael, CA (US)

( * ) Notice: Subject to any disclaimer, the term of this patent is extended or adjusted under 35 U.S.C. 154(b) by 27 days.

(21) Appl. No.: 15/573,781

(22) PCT Filed: May 14, 2016

(86) PCT No.: PCT/IB2016/000790
§ 371 (c)(1),
(2) Date: Nov. 13, 2017

(87) PCT Pub. No.: WO2016/181223
PCT Pub. Date: Nov. 17, 2016

(65) Prior Publication Data
US 2019/0003757 A1     Jan. 3, 2019

Related U.S. Application Data

(60) Provisional application No. 62/253,272, filed on Nov. 10, 2015, provisional application No. 62/161,173, filed on May 13, 2015.

(51) Int. Cl.
*F25B 21/02* (2006.01)
*F25D 29/00* (2006.01)
(Continued)

(52) U.S. Cl.
CPC ............ *F25B 21/02* (2013.01); *F25B 27/002* (2013.01); *F25D 11/00* (2013.01); *F25D 11/003* (2013.01);
(Continued)

(58) Field of Classification Search
CPC .......... F25B 21/00; F25B 21/02; F25B 21/04; H01L 35/30
(Continued)

(56) References Cited

U.S. PATENT DOCUMENTS 5,661,978 A * 9/1997 Holmes .................. F25B 21/02
                                                         312/209
2006/0260335 A1* 11/2006 Montuoro ................. H02J 3/32
                                                         62/236
(Continued)

FOREIGN PATENT DOCUMENTS

CN        1243978        2/2000
CN      202676300        1/2013
(Continued)

*Primary Examiner* — John F Pettitt, III
(74) *Attorney, Agent, or Firm* — Levine Bagade Han LLP

(57) ABSTRACT

A portable refrigeration system for use in transport of medicines or other valuable, temperature sensitive materials is disclosed. The system can use GPS positioning technology to provide absolute global location along with internet connection through a cellular modem on board which allows for communication to the cloud of temperature and transit data during device use. The refrigerator 10 can be powered by a rechargeable battery back that may be recharged through connection to AC mains supply or connection to the photovoltaic panel 26 included with the device 10. The insulated container can be held at a constant temperature through the use of vacuum insulated panel construction. The device 10 can be cooled through the use of thermoelectric cooling modules 68 coupled to the insulated chamber 74 and paired with a heat exchanger 56 with heat pipes 60 and a
(Continued)

system fan 54. The device 10 can be operated either through the included graphical user interface display 20 via touch or buttons or it may be accessed and controlled by a remote computer 80 through the cloud via a cellular connection 78.

8 Claims, 25 Drawing Sheets

(51) Int. Cl.

| | | |
|---|---|---|
| *F25D 11/00* | (2006.01) | |
| *F25B 27/00* | (2006.01) | |
| *G06Q 10/0832* | (2023.01) | |
| *G06Q 50/28* | (2012.01) | |
| *G01S 19/13* | (2010.01) | |
| *G06Q 10/20* | (2023.01) | |
| *F25D 3/08* | (2006.01) | |
| *H04L 67/12* | (2022.01) | |

(52) U.S. Cl.
CPC ............ *F25D 29/003* (2013.01); *G01S 19/13* (2013.01); *G06Q 10/0832* (2013.01); *G06Q 10/20* (2013.01); *G06Q 50/28* (2013.01); *F25B 2321/0251* (2013.01); *F25D 3/08* (2013.01); *F25D 2500/04* (2013.01); *F25D 2700/12* (2013.01); *F25D 2700/14* (2013.01); *H04L 67/12* (2013.01)

(58) Field of Classification Search
USPC .................................................. 62/3.2–3.7
See application file for complete search history.

(56) References Cited

U.S. PATENT DOCUMENTS

| | | | |
|---|---|---|---|
| 2008/0022696 A1* | 1/2008 | Welle .................... | F25B 21/04 |
| | | | 62/3.7 |
| 2010/0146991 A1* | 6/2010 | Ilercil .................... | F25B 21/02 |
| | | | 62/3.3 |
| 2013/0106607 A1 | 5/2013 | Clement et al. | |
| 2013/0245991 A1* | 9/2013 | Kriss .................... | F25D 29/003 |
| | | | 702/150 |
| 2013/0263611 A1 | 10/2013 | Kearney et al. | |
| 2014/0352334 A1 | 12/2014 | Barakat | |
| 2016/0003503 A1* | 1/2016 | Novisoff ................ | F25B 21/02 |
| | | | 62/3.3 |

FOREIGN PATENT DOCUMENTS

| | | |
|---|---|---|
| CN | 203163413 | 8/2013 |
| TW | M266433 | 6/2005 |
| TW | I471513 | 2/2015 |
| WO | WO 2013/153517 | 10/2013 |
| WO | WO 2016/181223 | 11/2016 |

\* cited by examiner

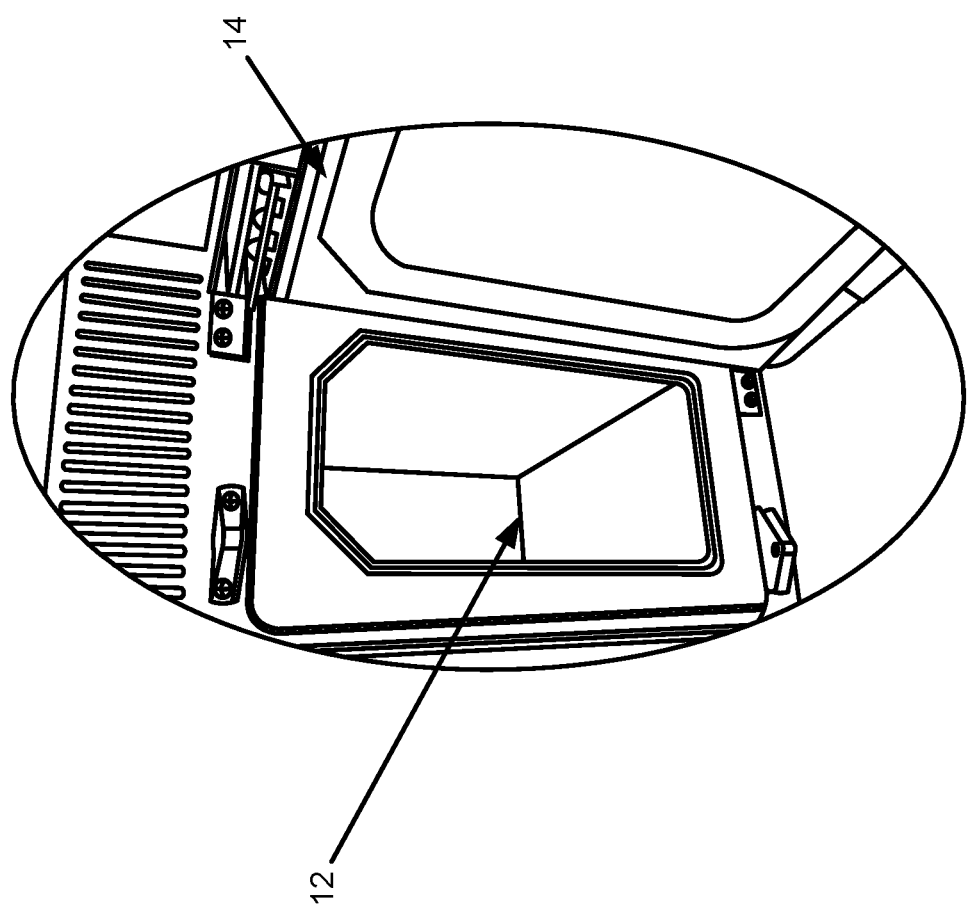
FIG. 1a"

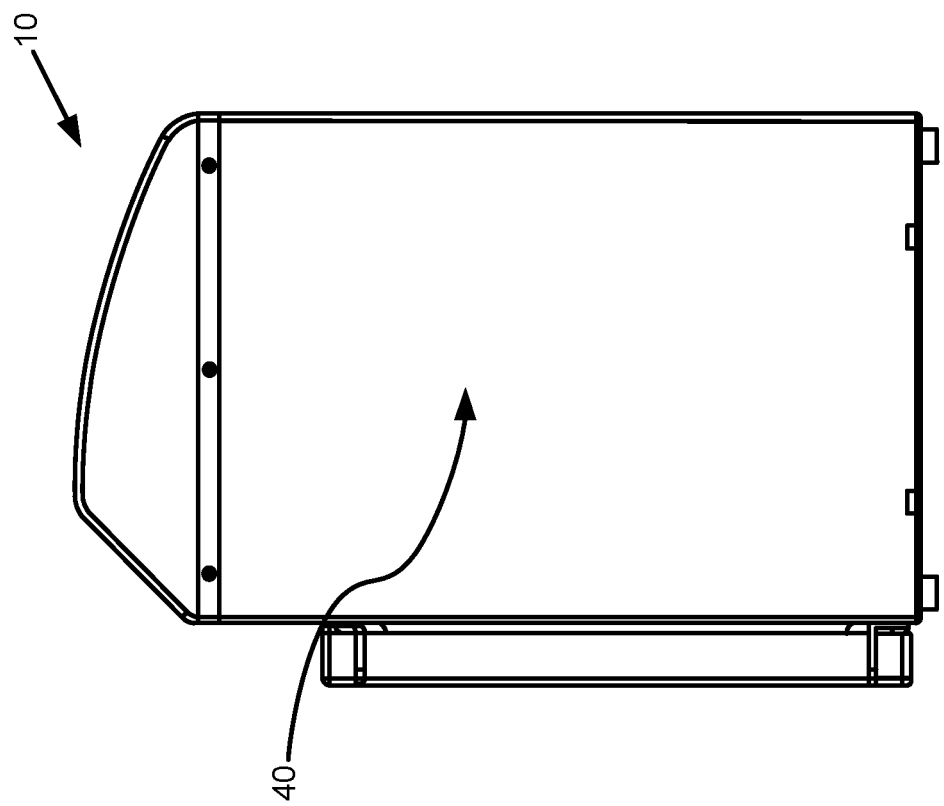

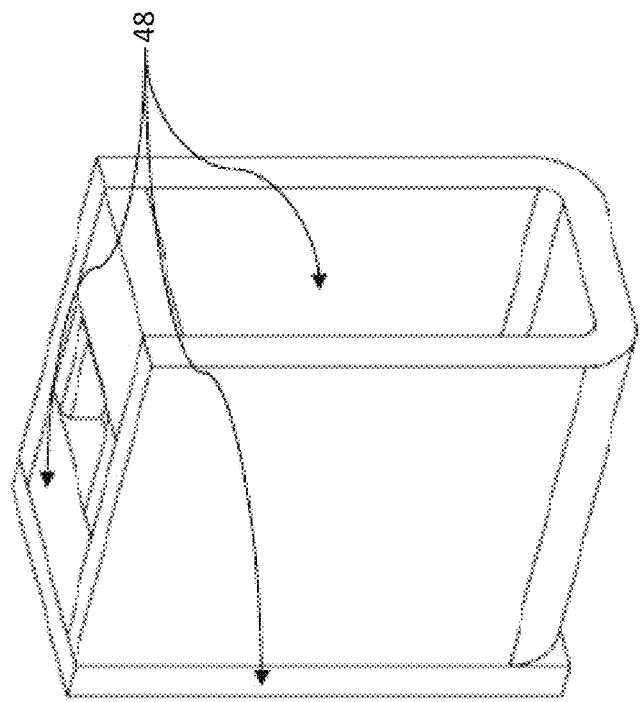
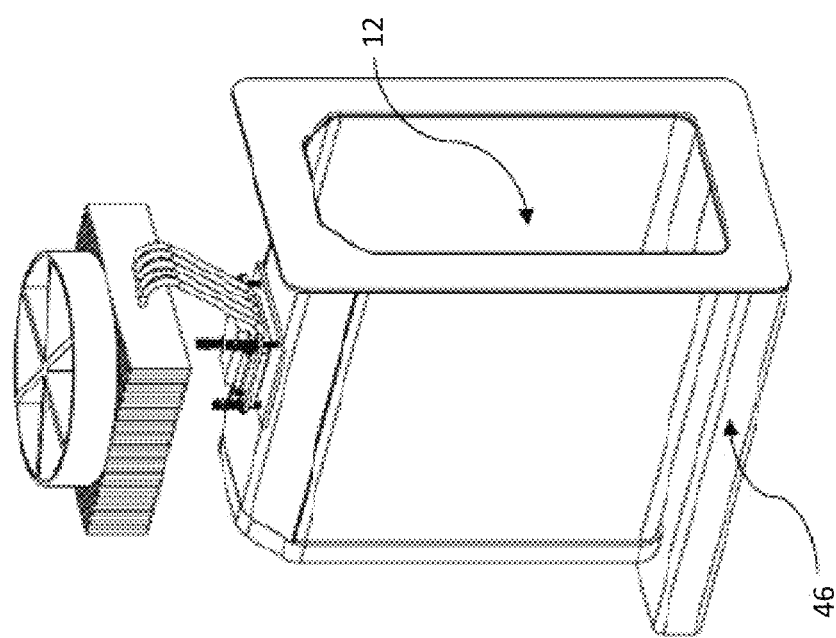

Exemplary Performance Specifications

| Feature | Specifications for SCS |
|---|---|
| Estimated holdover time | 24 hours (no external power) |
| Battery Power Supply | On Board Lithium Iron Battery pack, approved for air transit. |
| Mains Power Supply | On Board switching power supply usable with 110 V (60hz) – 240 V (50 hz) |
| Product life cycle | 3 years |
| Refrigerator Volume | 8 Liters |
| Weight estimate | 8 kg |
| Target sales price | $800 |
| Remote monitoring | GPS locatability and tracking<br>Cellular connectivity<br>Real time temp feedback & run reporting<br>On-board temperature monitoring |

Figure 7

PORTABLE REFRIGERATOR AND METHOD OF USING

CROSS-REFERENCE TO RELATED APPLICATION

The present application is related to U.S. Provisional Application Nos. 62/161,173, filed May 13, 2015, and 62/253,272, filed Nov. 10, 2015, both of which are incorporated by reference herein in their entireties.

BACKGROUND

1. Technical Field

A portable refrigerator, and more particularly to a portable, thermoelectric refrigerator with attendant temperature monitoring features useful in the transport of temperature sensitive materials is disclosed.

2. Description of the Related Art

Portable cooler boxes and refrigerators are available in various embodiments.

The need for controlled temperature delivery systems is present in many fields of use but none more obvious than in the transport of life saving vaccines to remote locations in the world. If the temperature of these vaccines goes too high or drops below freezing it can permanently inactivate the vaccines thus rendering them useless in inoculation against disease and can in some circumstances make them unsafe for use. Thus the need for refrigerating medicines is a serious problem in lesser developed countries and remote parts of the world without consistent electrical power.

In the delivery of life saving vaccines there is a need to monitor the temperature of vaccines as they are in transit. The World Health Organization stipulates that most vaccines are to be kept in a safe, cool range of 2 degrees to 8 degrees Celsius. The lack of constant, reliable monitoring systems for cooler boxes used in vaccine delivery programs creates uncertainty in the safety of medicines delivered, often times makes waste in that medicines that are unknown to have been kept within the safe range must be disposed of, and sometimes requires redundant and ineffective cooling methods to assure the safety range is maintained in absence of better methods to monitor the temperature of the contents of the delivery device. In light of this circumstance there is a need for constant monitoring of both internal temperatures close to the medicines or goods in transit and the ambient temperature the device is experiencing.

Because of the need to have medicines both readily available and maintained at a certain temperature, insulated containers have been available for many years for transporting vaccines and other similar medications in transit to the field site of use. However, most such devices are passive insulated containers filled with blocks of ice or frozen gel packs which rely on a separate freezer system for refreezing. There then remains a need for a self-contained, compact and portable cooling storage system for transporting items that require temperature control.

SUMMARY

A portable refrigerator that can be used as a medicine or temperature sensitive substances transport device that can maintain appropriate temperatures to prevent spoilage or damage to the items being transported is disclosed. The use of battery power to provide refrigeration in off-grid sites or when no AC mains power is available to power an electronic device is also disclosed. The battery in the refrigerator can be recharged through connection to AC mains power (e.g., a wall outlet connected to a generator or municipal grid power from a power plant), one or more photovoltaic panels on the refrigerator, or combinations thereof. The refrigerator can have highly efficient, vacuum insulated panel construction, for example, delivering a long lasting cold temperature retention vessel. Further, the refrigerator can have an onboard microcontroller and graphical user interface which allow for the management of and contact monitoring of both internal and external temperatures to the storage chamber, the ability to determine remaining battery charge, and both location through the use of a GPS module and communications to the internet cloud through a cellular modem connection.

Accordingly, described herein is a portable medical storage device, comprising an insulated container surrounded by vacuum insulated paneling; a thermoelectric cooler in thermal communication with the insulated container and cooled through contact with a heat exchanger and fan assembly; a battery energy source that is charged either through connection to AC mains or through the use of energy generated by the included photovoltaic module; a microcontroller on board control system with included GPS for location services and cellular connections for communication to Internet cloud networks and simultaneous presentation of system performance.

Additionally, described herein is a portable medical storage device comprising an insulated container with an insulated door; an internal cavity surrounded by the insulated container; a cooling assembly in thermal communication with the cooling assembly comprising a cold plate, a thermal conduction member, a thermal electric cooler, a heat sink with heat pipe tubing, and a fan; a temperature sensor for sensing the temperature within the container; and a microcontroller and control input panel in electrical communication with the thermoelectric cooler, the temperature sensor and the battery.

Also disclosed is a refrigeration unit system that can have a portable refrigeration unit and a remote computer in data communication with the portable refrigerator unit. The refrigerator unit can have an insulated internal space. The unit can be less than 22 kg. The portable refrigeration unit can have batteries, a location sensor, a telecommunication radio, and one or more thermometers configured to measure the ambient temperature outside of the unit and the internal temperature inside of the internal space. The unit can have a memory storing data recording contents of the internal space.

The location sensor can have a GPS receiver. The telecommunication radio can have a cellular modem. The cellular modem can have a GSM modem.

A method for using the refrigeration unit system is disclosed. The method can include calculating by the remote computer a remaining time of operable life of the refrigerator unit. The operable life can include the amount of time the unit has left where the internal space will remain above a desired temperature. The method can also include calculating by the remote computer a route (i.e., travel path) to a desired destination for the unit.

The method can also include calculating the range of the unit. The range can be calculated with the remaining time of operable life, a length of the route, and a historical speed of the unit.

Further disclosed is a refrigeration unit system that can have a cold chamber central to an assembly with a thermoelectric module affixed to the chamber in direct contact whereby the contact can allow for the immediate conduction of heat away from the cold chamber. The system can have vacuum insulated panels surrounding the cold chamber and arrayed in such a fashion so as to create a tight seal and a well-insulated environment. The thermoelectric module can be in mechanical contact with a heat conducting plate that has both fins for conductive cooling by air circulation and heat pipes that conduct heat away from the plate and to a larger heat exchanger. The heat exchanger can be coupled to a fan that can circulate cooling air over the fins of the heat exchanger to cool the system. The system can have thermal probes attached to the cold chamber and the heat exchanger. The thermal probes can be exposed to ambient environment or temperature in a manner that allows for monitoring of the system temperatures or temperature states. These temperature states in turn can be monitored by the system microprocessor and used as inputs to a cooling algorithm that can provide the maximum amount of cooling time for the cold chamber when powered by a rechargeable battery in the system housing.

The cold chamber can be made from a metal, such as aluminum sheet metal. The vacuum insulated panels can be formed to the contours or the cold chamber and sealed at the edges with closed cell foam or polymer tape.

The algorithm used to run the thermoelectric cooling module can be optimized to provide the greatest duration of cooling time when running on power coming from the rechargeable battery in the system. The algorithm can allow the unit to run at a set temperature or a range of temperatures and pulse between on and off states so as to keep the average temperature within the desired range while using the least amount of power over time from the battery.

The system microprocessor can sense the connection to AC mains power and simultaneously seeks to charge the battery pack while also running the thermoelectric cooling module in order to cool the cold chamber.

The thermoelectric cooling module can be run at a heightened state of energy so as to rapidly cool the unit to the low end of the set temperature range.

The algorithm controlling the thermoelectric module power state can adjust the power to cooling module when the system is removed from AC Mains power and run solely on battery power in such a manner so as to conserve more power but still run within the specified temperature range over the longest possible hold time.

Furthermore, a method of cooling a refrigeration system is disclosed that can include pulsing a thermoelectric cooling module with power from a power supply that is either powered by a battery pack or AC mains power and then converted to the DC energy used by the thermoelectric module. The thermoelectric module can be controlled by a microprocessor running a software algorithm that monitors temperature provided by on board temperature monitoring probes. The software can determine the optimum power to be delivered to the thermoelectric module at any given time in order to balance the requirements for rapid cooling of the cold chamber, preservation of the charge in the battery pack, and consistency of cold holding temperature in the cold chamber.

The software algorithm can adjust the output of the power supply in response to the presence of external power provided by AC mains connection, DC source connection from a PV solar panel, DC electric connection in a vehicle, DC power coming from the battery pack, or combinations thereof, to reduce battery depletion and keep the thermoelectric module running at an adequate rate to maintain set temperatures within the internal space of the refrigerator.

The software algorithm can improve over time of use by monitoring the response time of the thermoelectric module, the ambient temperature, and the battery charge state. The software algorithm can monitor the battery charge state and adjust power to the thermoelectric module up and until the temperature readings from the system are outside of the temperature settings for the system and in turn the software can signal to the system to sound any alarms to notify the user of the device, or the remote monitor of the device performance, that the prescribed temperature range has been transgressed.

BRIEF DESCRIPTION OF THE DRAWINGS

FIGS. 1a through 1e are isometric perspective, front, right, rear, and top views, respectively, of a variation of the portable refrigerator unit in open (FIG. 1a) and closed configurations (FIGS. 1b through 1d).

FIG. 1a' is a photographic image of a variation of the refrigerator.

FIG. 1a' is a close-up of a photographic image of the internal space and surrounding components of a variation of the refrigerator in a configuration with the door open.

FIG. 3a shows the insulated container without the insulating panels surrounding it. At the bottom of the figure is shown the power pack which contains the rechargeable battery, the charge controller, and other power electronics. FIG. 3b shows the vacuum insulated panel assembly which surrounds the insulated container.

FIG. 7 is a table of exemplary performance specifications for the refrigerator.

DETAILED DESCRIPTION

Figure 1A:
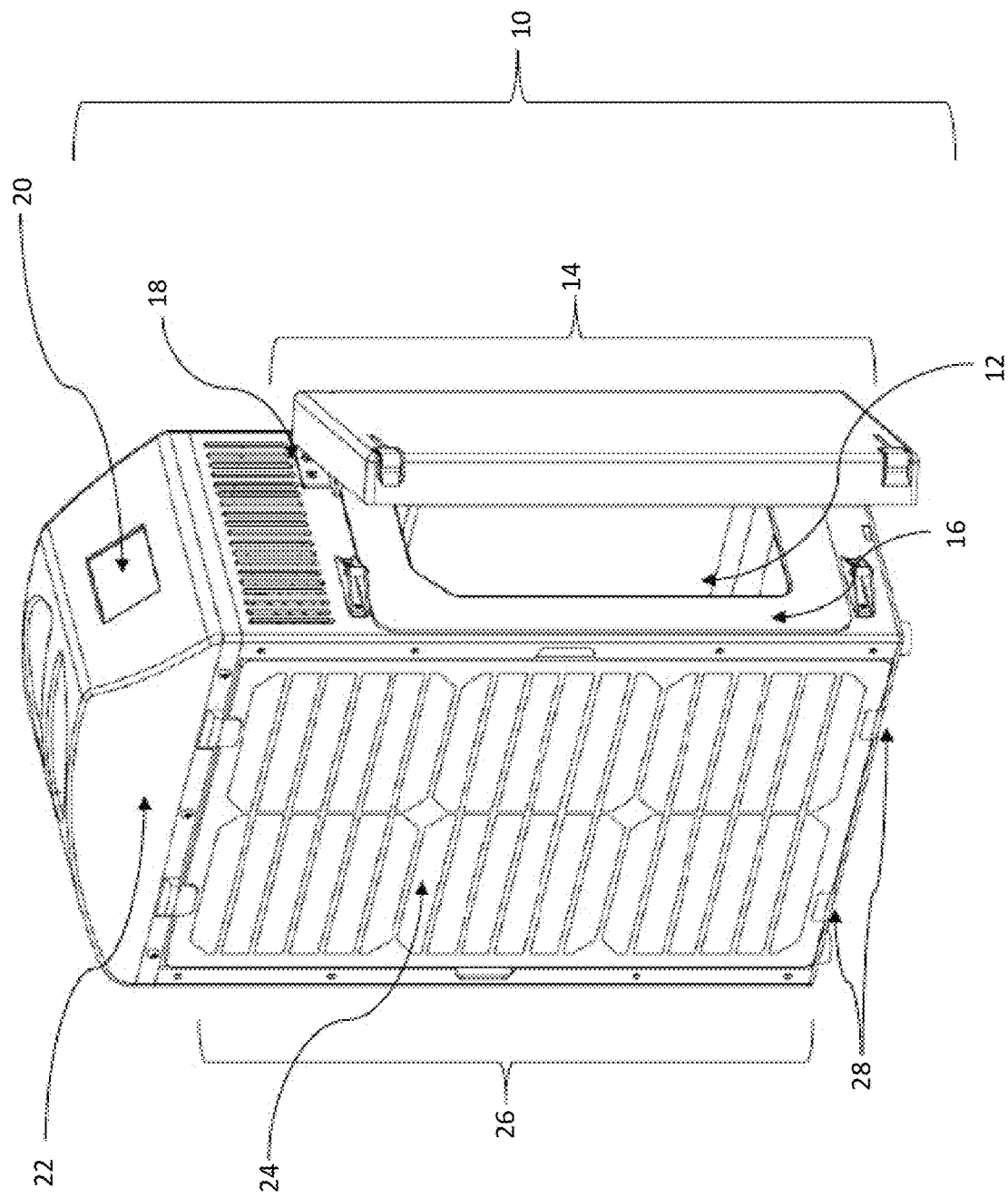
Figure 1A:
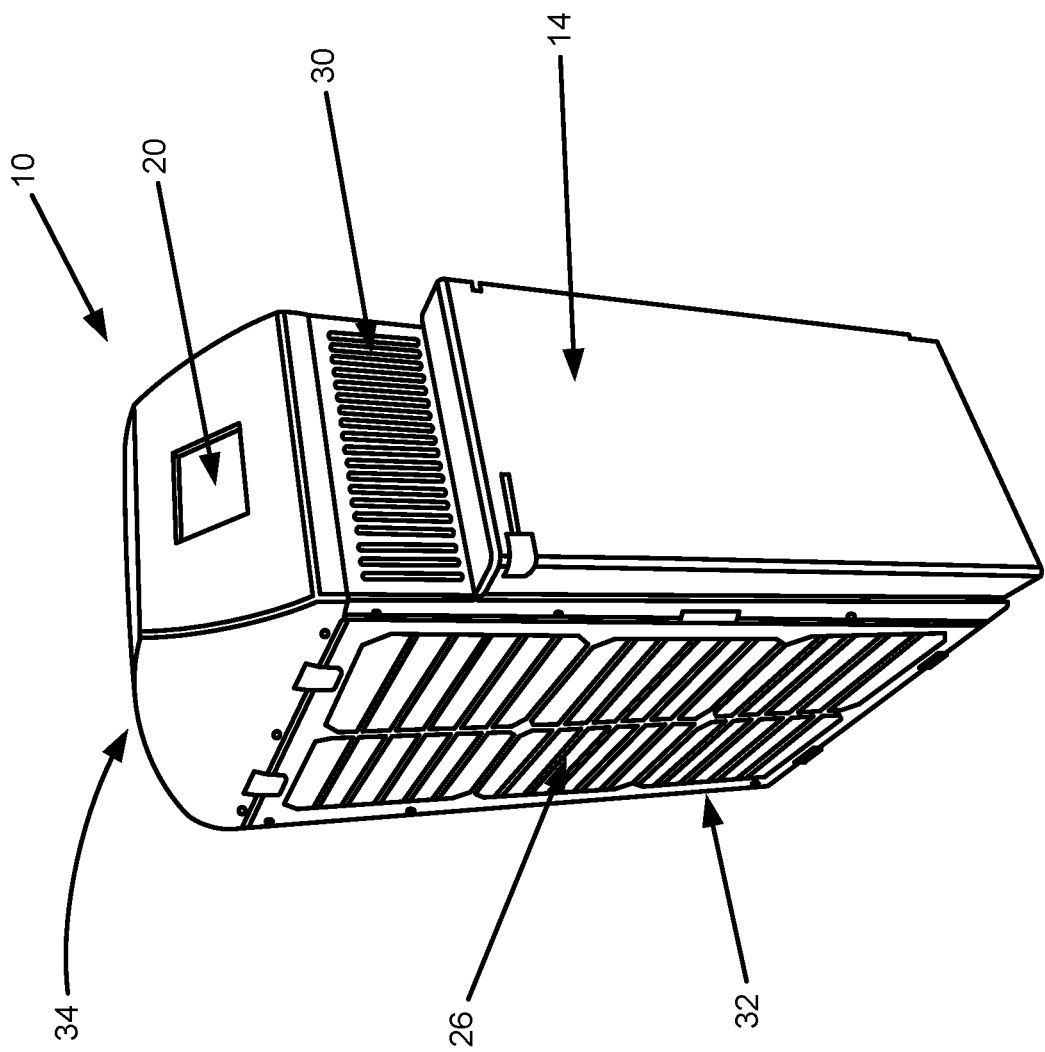

FIGS. 1a, 1a' and 1a" show a portable refrigeration unit 10 (also referred to herein as a refrigerator) of approximately 30 inches in height, 10 inches in width, and 14 inches in depth, or less in dimensions. The portable refrigeration unit 10 can contain an insulated container 12 internal to the assembly that can have an approximate 4-12 liter volume, for example an 8 liter volume, cold chamber or internal space. The insulated container 12 can be held within an enclosure assembly and has an insulated door 14 to allow access to the contents of the insulated container 12. The insulated door 14 can rotate about door hinges 18 at both top and bottom of the door. The insulated door 14 when pressed against the enclosure assembly can create a seal 16 that keeps the cold internal temperature stable compared to the higher outside ambient temperature of the air. The refrigerator unit 10 can have a detachable photovoltaic panel assembly 26 comprised of photovoltaic cells 24. This photovoltaic panel assembly 26 is used in the generation of electricity from incident sunlight falling on the photovoltaic cells 24. The photovoltaic panel assembly 26 can be retained on the side of the portable refrigerator 10 during transport through the use of panel mounting tabs 28 that capture the top and bottom edge of the photovoltaic panel 26. The unit can have an AC outlet and/or plug and cord 32, for example for unit operation and on-grid charging. On top of the assembly is a bezel 22 that provides a place for the graphical user interface screen 20 to be placed and accessed.

As shown in FIG. 1a', the unit 10 can have a touch screen user interface screen 20. The unit can have intake vents, such as a cooling intake 30. The internal space 74 of chamber can have shelves 72, as shown in FIGS. 5a through 5e, and/or custom sections. The unit can have a carrying handle 34 (obscured by the case in FIG. 1a') that can be foldable to lay flush against the top surface of the unit when the handle is not in use. The case of the unit 10 can have a photovoltaic panel assembly 26 or solar panel, for example hingedly attached to the remainder of the case so the solar panel can be rotated upward to be more directly facing the sun when a stronger charge is desired.

The unit can have an electrical power plug 32 (e.g., an AC plug for attaching to an AC main power source). The plug 32 can be on an extendable power cord and can retract and be obstructed by the solar panel when not extended.

FIG. 1a" illustrates that the insulated door 14 of the unit can rotate open, accessing the insulated container 12 or internal space 74 of the unit 10.

Figure 1B:
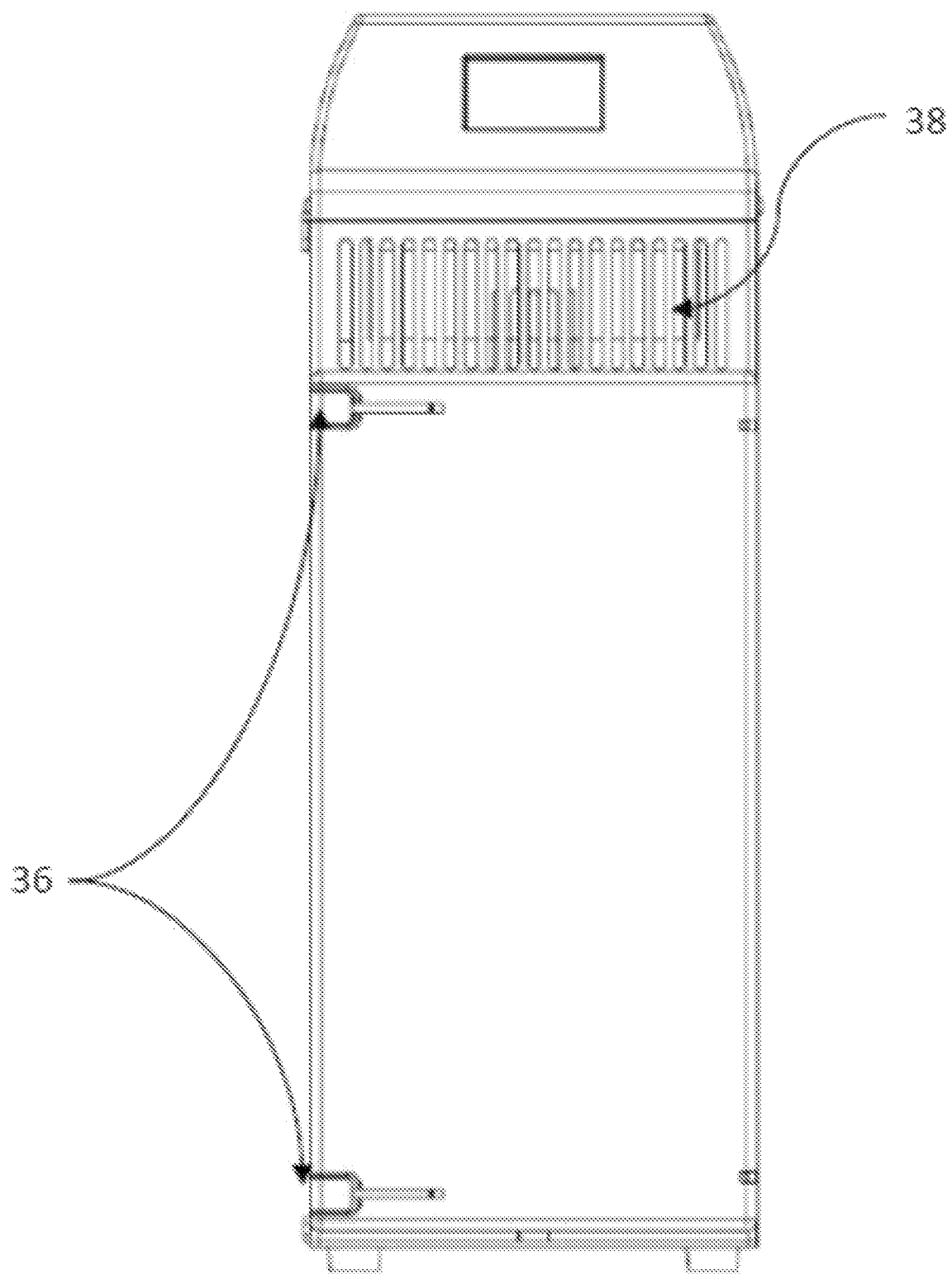

FIG. 1b shows the front of the portable refrigeration unit 10 with the air intake 38 or cooling intake 30 slots for the heat exchanger exhaust circuit visible near the top of the system. The system show in 1b has the insulated door 14 closed and the door latches 36 shown in the locked position, thus holding the door closed under compression for transport.

FIG. 1c shows the right side of the enclosure for the portable refrigeration unit 10 where the side material of the enclosure 40 is made from sheet metal. This material could be aluminum, steel or another lightweight alloy suitable for durable, exterior use devices.

Figure 1E:
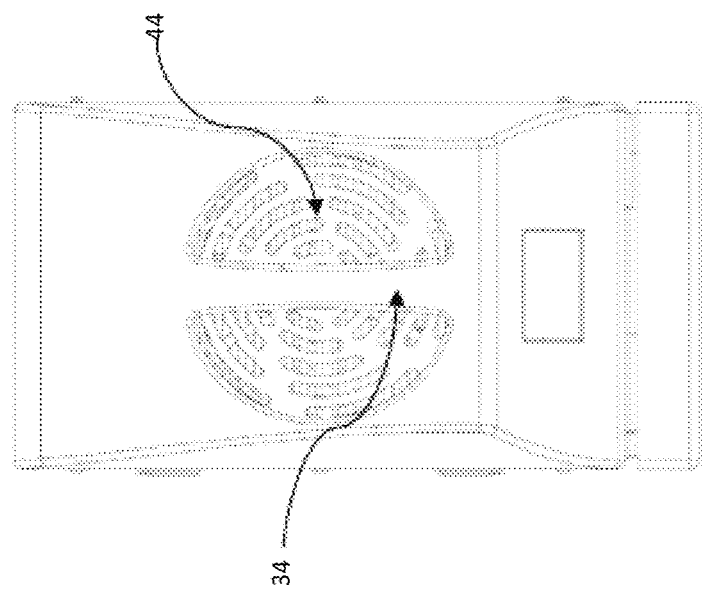
Figure 1D:
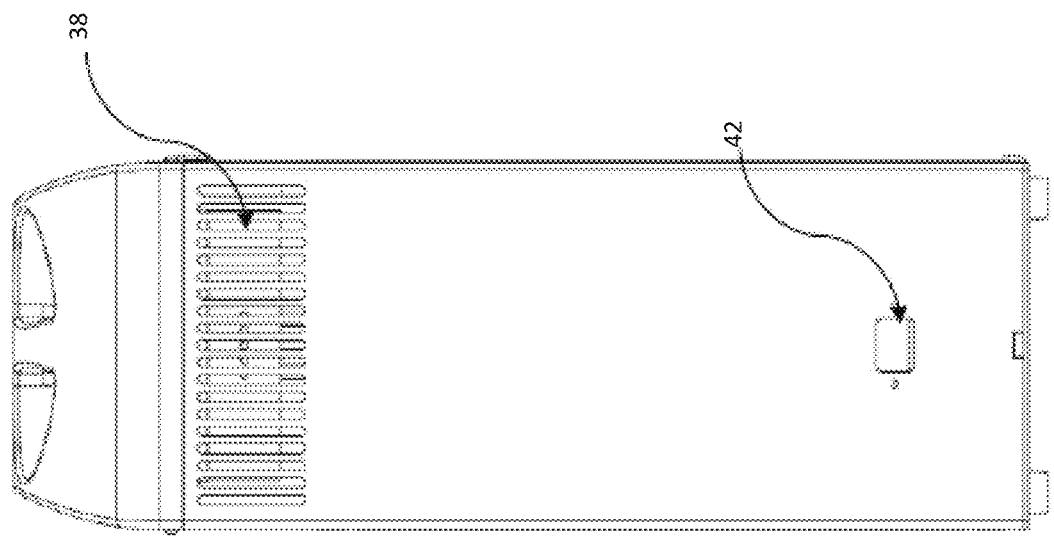

FIG. 1d shows the back of the portable refrigeration unit 10 with the air intake slots 38 disposed near the top of the assembly. On the back panel of the unit can also be found the AC power inlet 42 for connection of a power cord. Next to the inlet 42 for the power cord can be a fuse holder and a power switch for safety and operation of the unit during energizing.

FIG. 1e shows the top of the portable refrigeration unit 10 which has a ventilated air exhaust 44 in the top of the bezel 22. This exhaust area allows for hot air to be released from the heat exchanger assembly 56 during operation and more specifically for the exhaust fan 54 to vent the hot system as it operates. Above the heat exhaust area is a carrying handle 34 integrated into the bezel 22 at the top of the unit. This handle 34 allows for the portable unit to be carried in a fashion similar to that of a suitcase. The portable refrigeration unit 10 can weigh less than about 22 kg, for example from about 6 kg to about 22 kilograms depending on component selection, size of battery and insulated container volume. The unit can be used in the field for the delivery of cool items.

Figure 2:
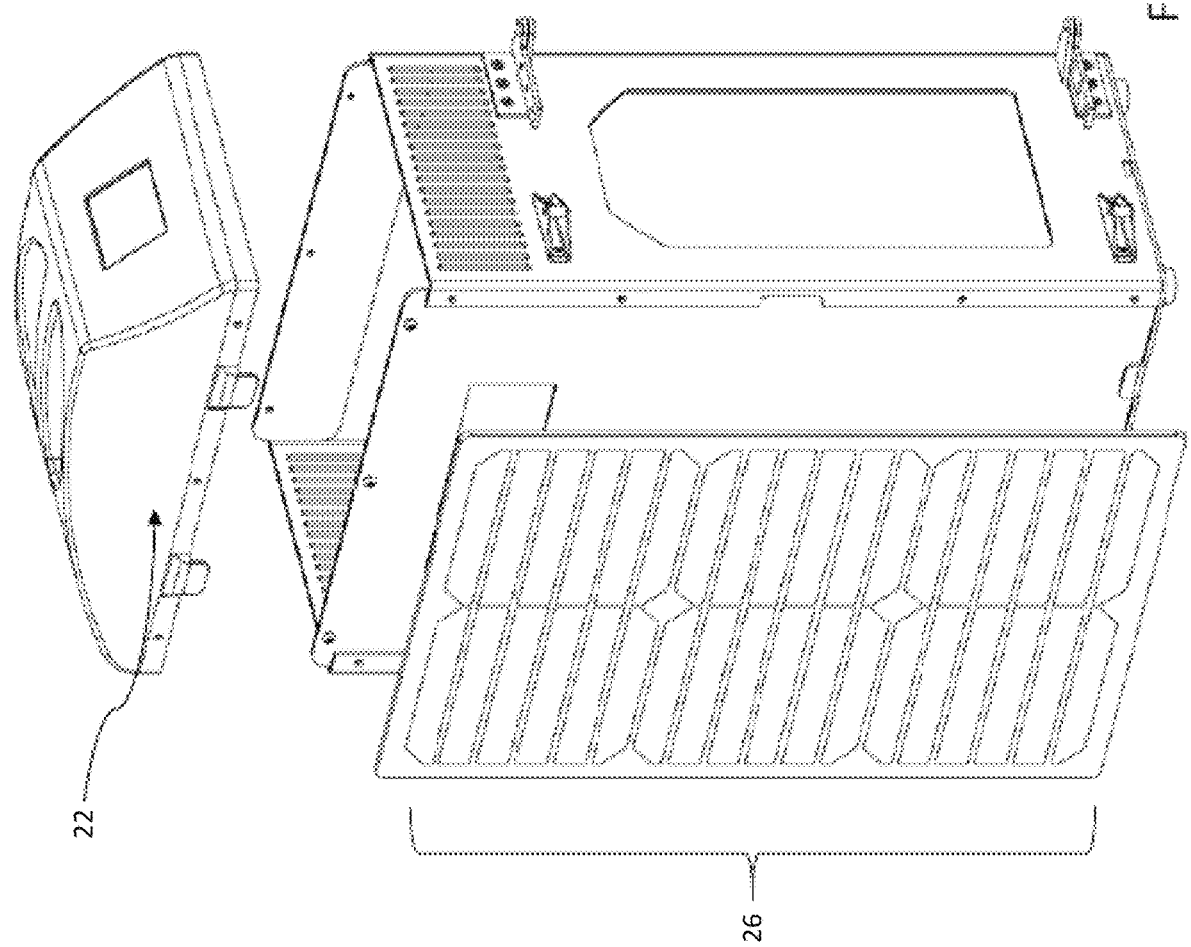
FIG. 2 is an isometric view with the top bezel and photovoltaic panel shown in a removed configuration.

FIG. 2 shows the photovoltaic panel 26 unmounted from the side of the unit 10 assembly thus allowing for the panel to be placed at a distance from the unit to collect the sun's rays and generate electricity to charge the on board battery system. The distance this panel can be separated from the unit is determined by the length of hook up cable used between the photovoltaic panel 26 and the unit. A typical hook up cable length might be from 5-15 meters, thus allowing for placement of the panel outside of a clinic area where the cables could be run through an open window to the portable refrigeration unit 10. The bezel 22 is also shown unattached as it would need to be for initial assembly and possibly for servicing of the exhaust fan 54 or to allow access to the microcontroller printed circuit board housed behind the user interface screen. The bezel 22 would be removed to allow access to wiring, or to switch a sim card on the communications printed circuit board attached to the microcontroller PCB.

FIG. 3a represents the internal elements of the portable refrigeration system 10. The insulated container 12 is shown without the surrounding vacuum insulated panel insulation assembly. On top of the insulated container assembly is the heat exchanger assembly 50. Disposed below the insulated container 12 component of the assembly is the power pack 46 assembly. The power pack 46 contains the rechargeable batteries which may be of a lithium ion type (LiON) or a lithium iron (LiFE) material or of the more traditional lead acid variety. The batteries sit next to the charge controller and the system power supply that determines the proper charge levels for the batteries and converts incoming AC power to the appropriate DC power for use in the system.

FIG. 3b shows the vacuum insulated panel assembly 48 of individual panels, both of a flat nature and in a bent configuration. These panels can be made from expanded foam, metallized film and/or aluminum foil which has been bonded and then sealed under vacuum thus creating highly effective insulation board materials. This vacuum insulated panel assembly 48 can be used as a jacket for the insulated container portion 12 of the device and keeps the internal portion of the system very cold as required to provide the appropriate level of cooling to the contents of the portable refrigeration system 10.

Figure 3C:
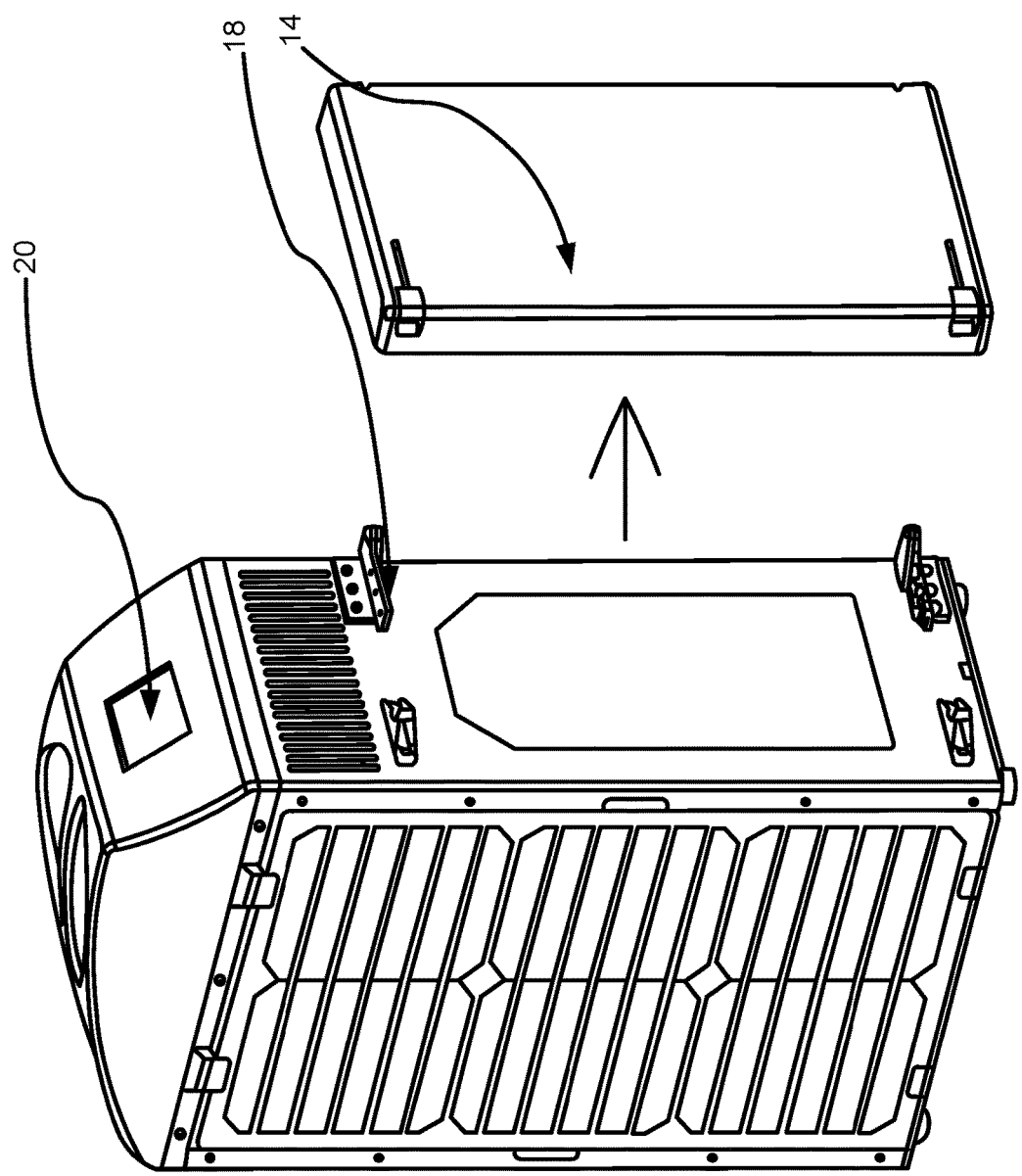
FIG. 3C shows the attachment of the insulated door to the insulated container.

FIG. 3c shows the insulated door 14 separate from the portable refrigeration system and demonstrates how the door can be mounted on the hinges 18 and made to swing into place and close tight as is represented in the previous figures. The user interface screen 20 located in the bezel 22 part of the device has both touch screen capabilities and soft-key functionality that allows for changing input screens depending on user intention and stage of use. Behind the user interface screen 20 can be a printed circuit board (PCB) containing the microcontroller for system level operation, monitoring, power adjustment and feedback in the form of temperature readings to the on board communication module that can execute tracking algorithms (including receiving satellite location data) for the unit and communication to the internet cloud.

Figure 4A:
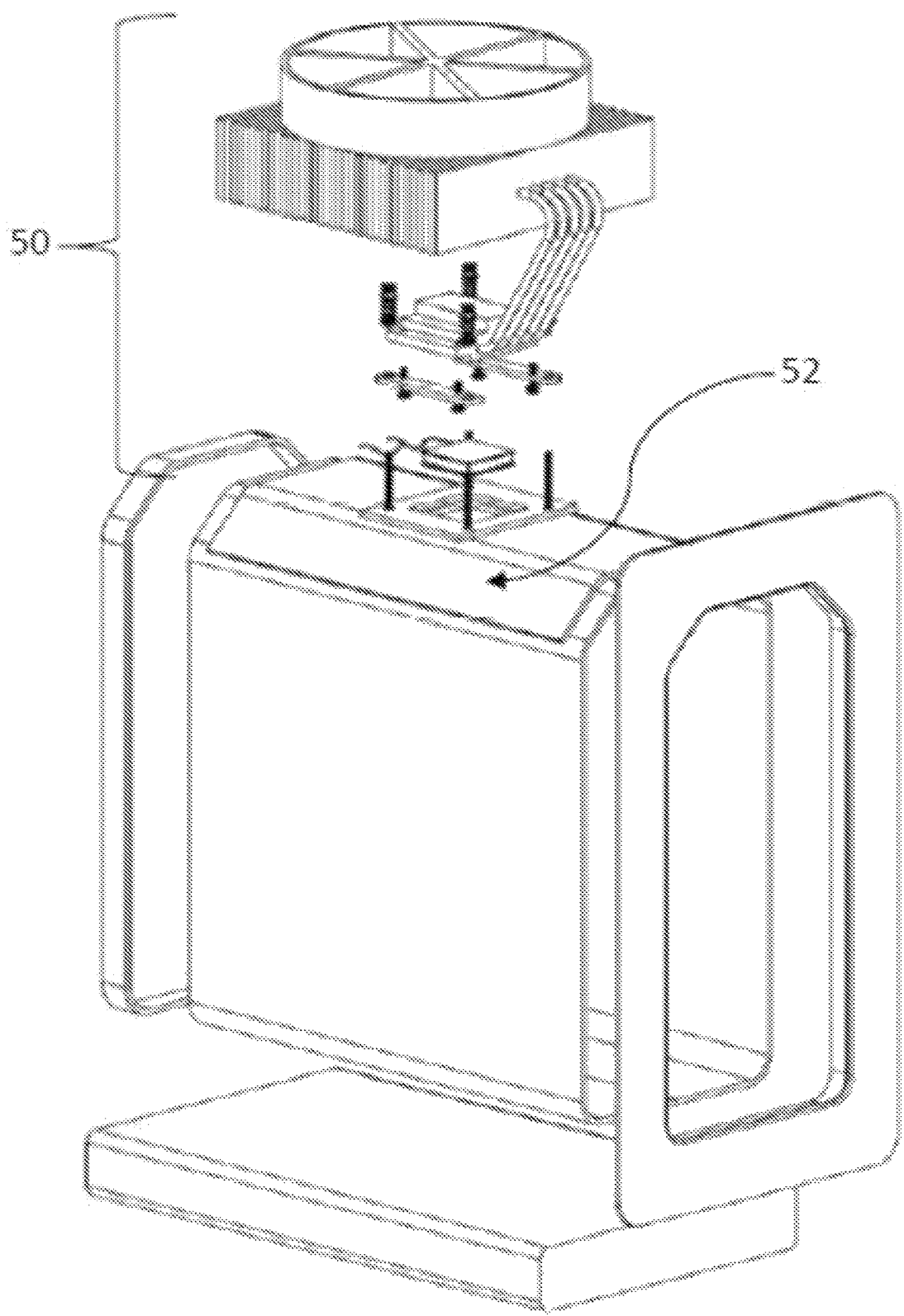
FIG. 4a is an exploded view of a variation of the portable refrigerator unit having the assembly of the heat exchanger on the insulated container with the TE module in mechanical contact with both the surface of the insulated container and the heat exchanger assembly.
Figure 4B:
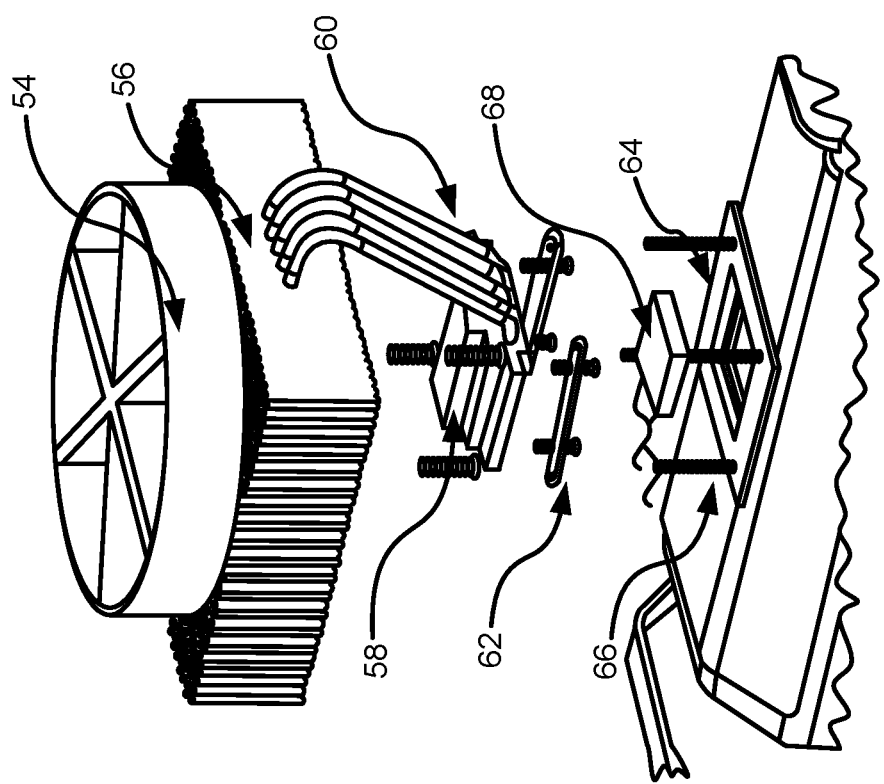
FIG. 4b shows the detail of the heat exchanger assembly including the cold plate, the thermoelectric module, the module mounting frame, the module mounting posts, the module mounting brackets, the hot plate, the heat pipes, the heat exchanger and the exhaust fan. At the bottom of the assembly is shown the battery pack and charging elements of the assembly.
Figure 5A:
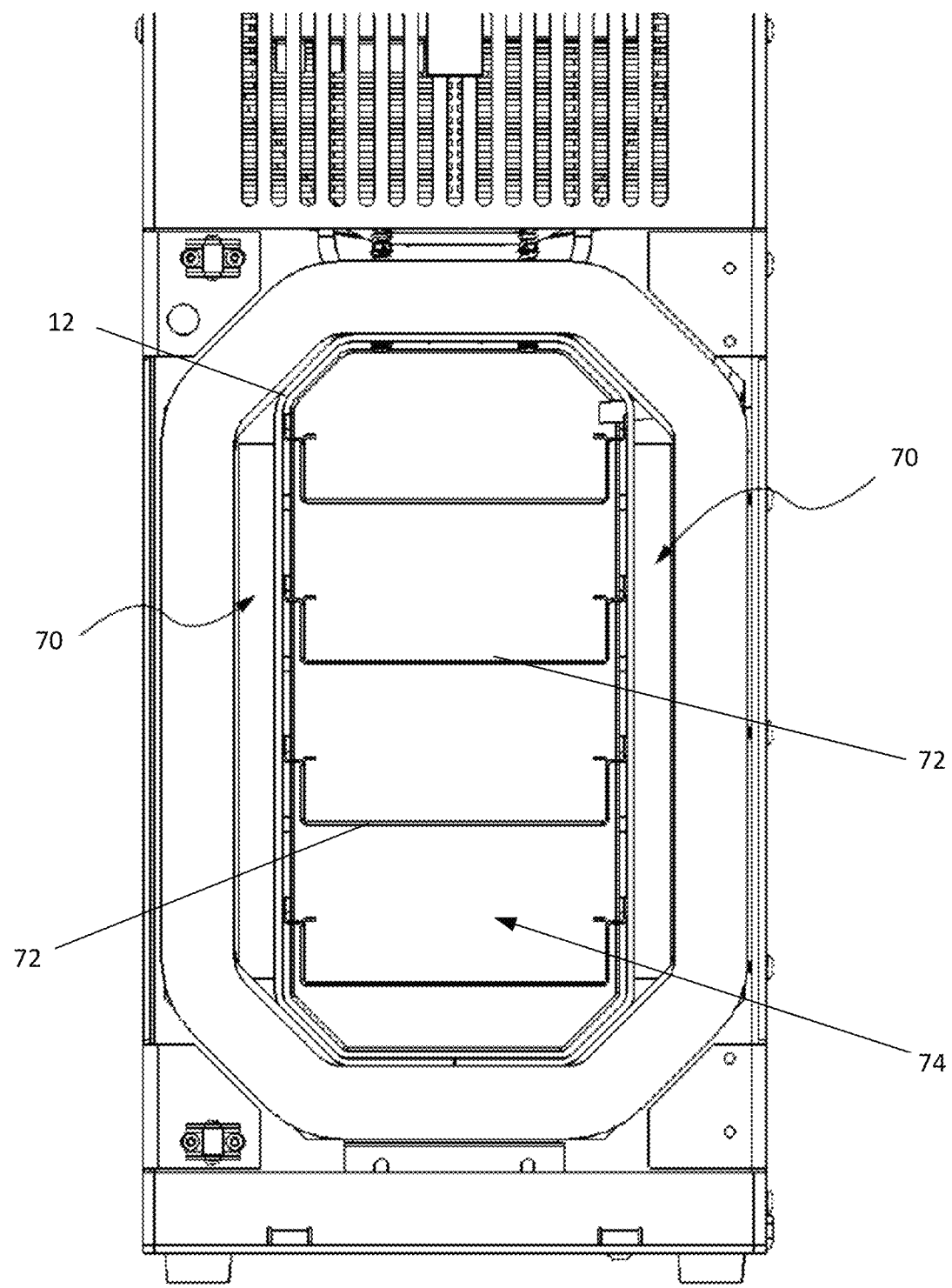
FIGS. 5a, 5b are cropped front and isometric views, respectively, of a variation of the refrigerator without the front door for illustrative purposes.
Figure 5B:
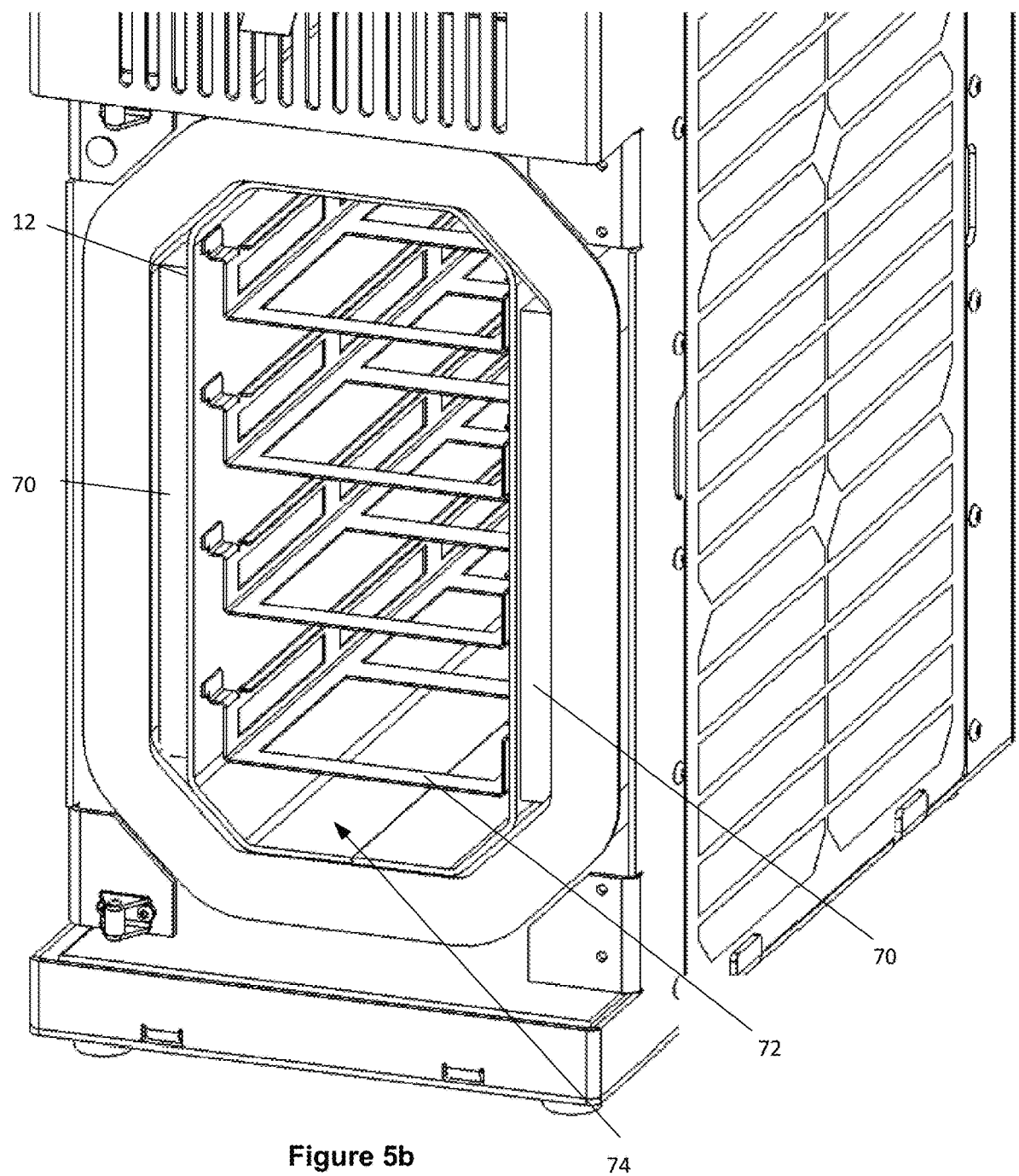
Figure 5C:
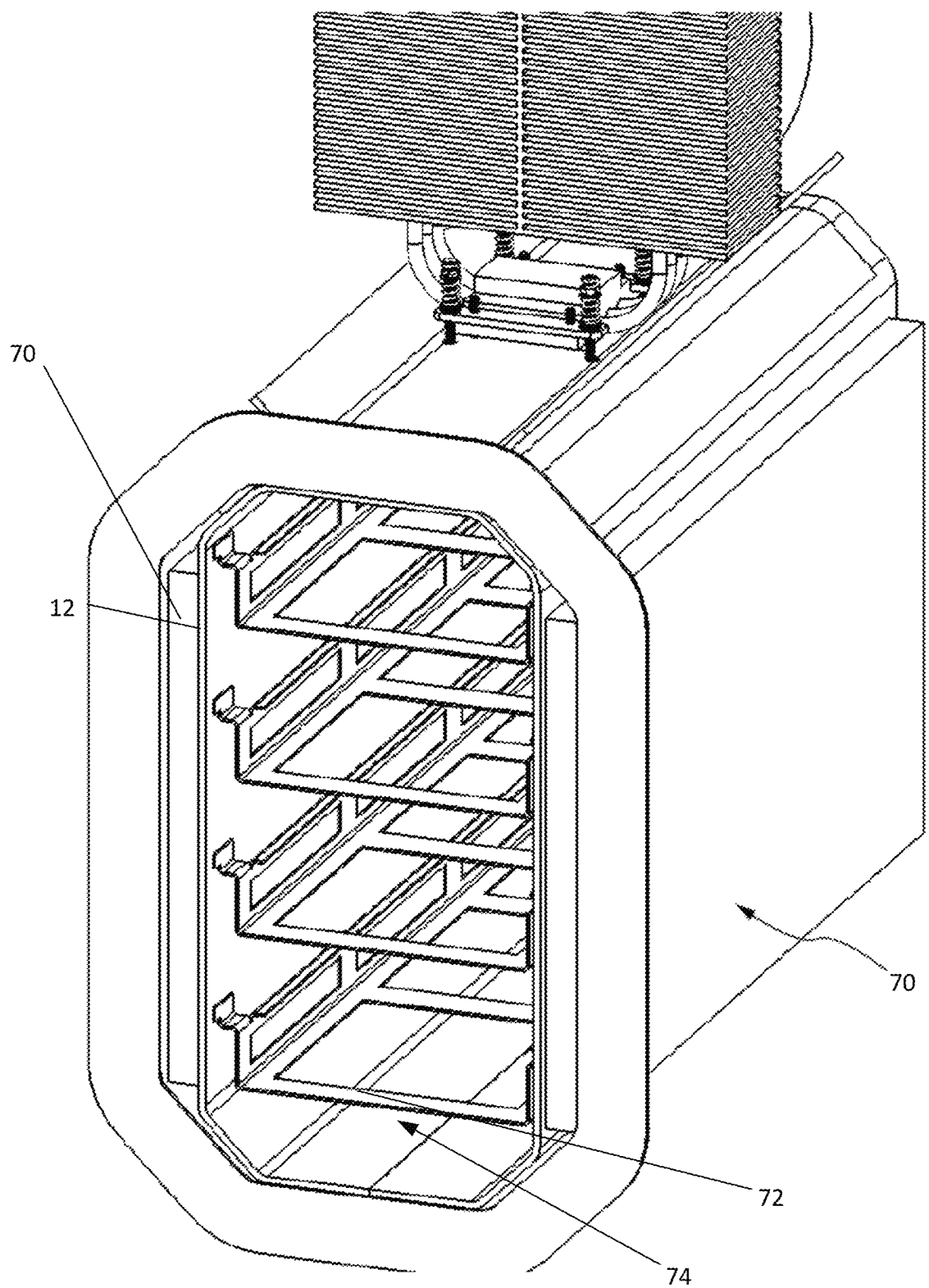
FIG. 5c is a cropped isometric view of the refrigerator of FIGS. 5a and 5b without the enclosure shown for illustrative purposes.
Figure 5D:
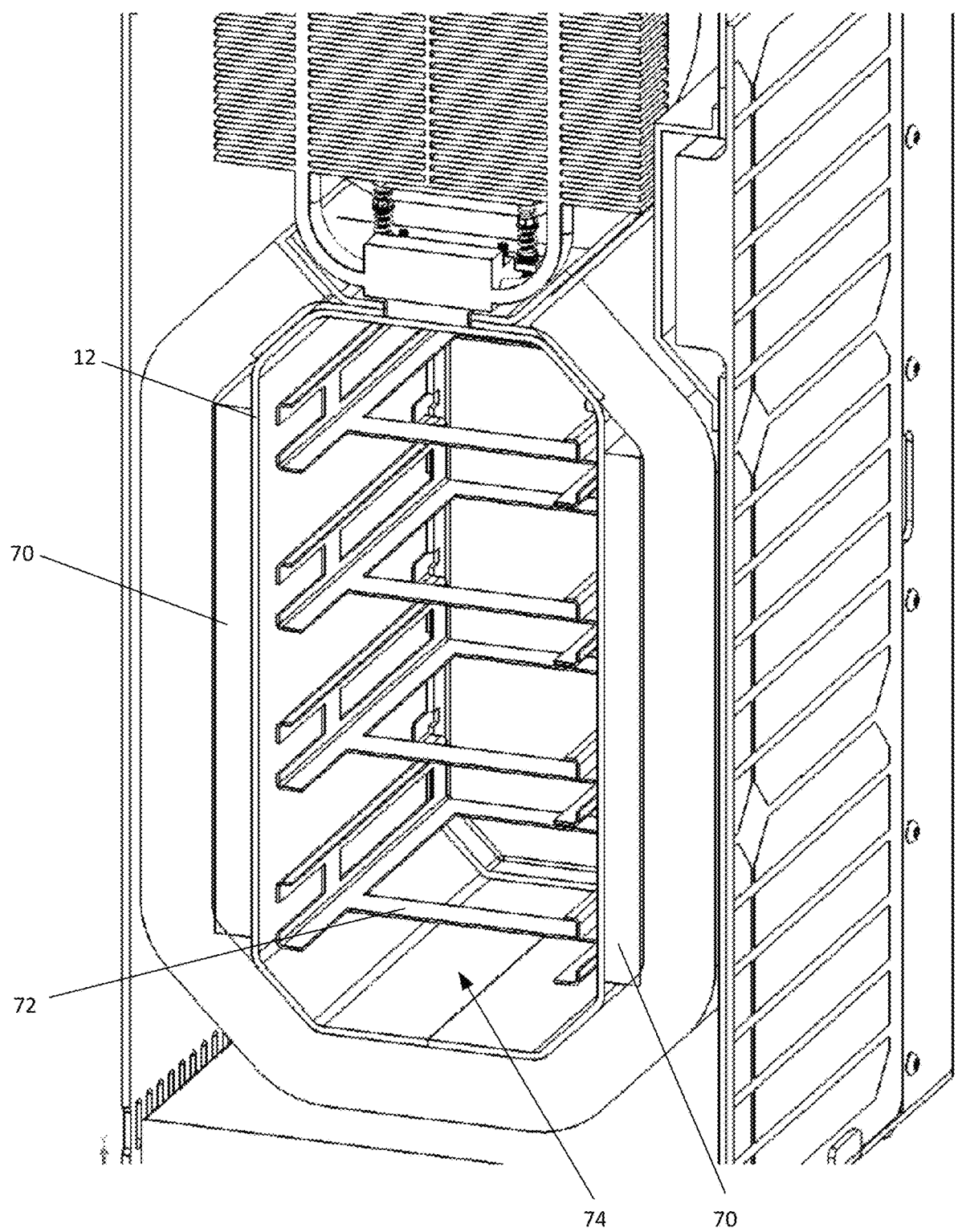
FIGS. 5d and 5e are cropper isometric and front section views, respectively, of the refrigerator of FIGS. 5a and 5b.
Figure 5E:
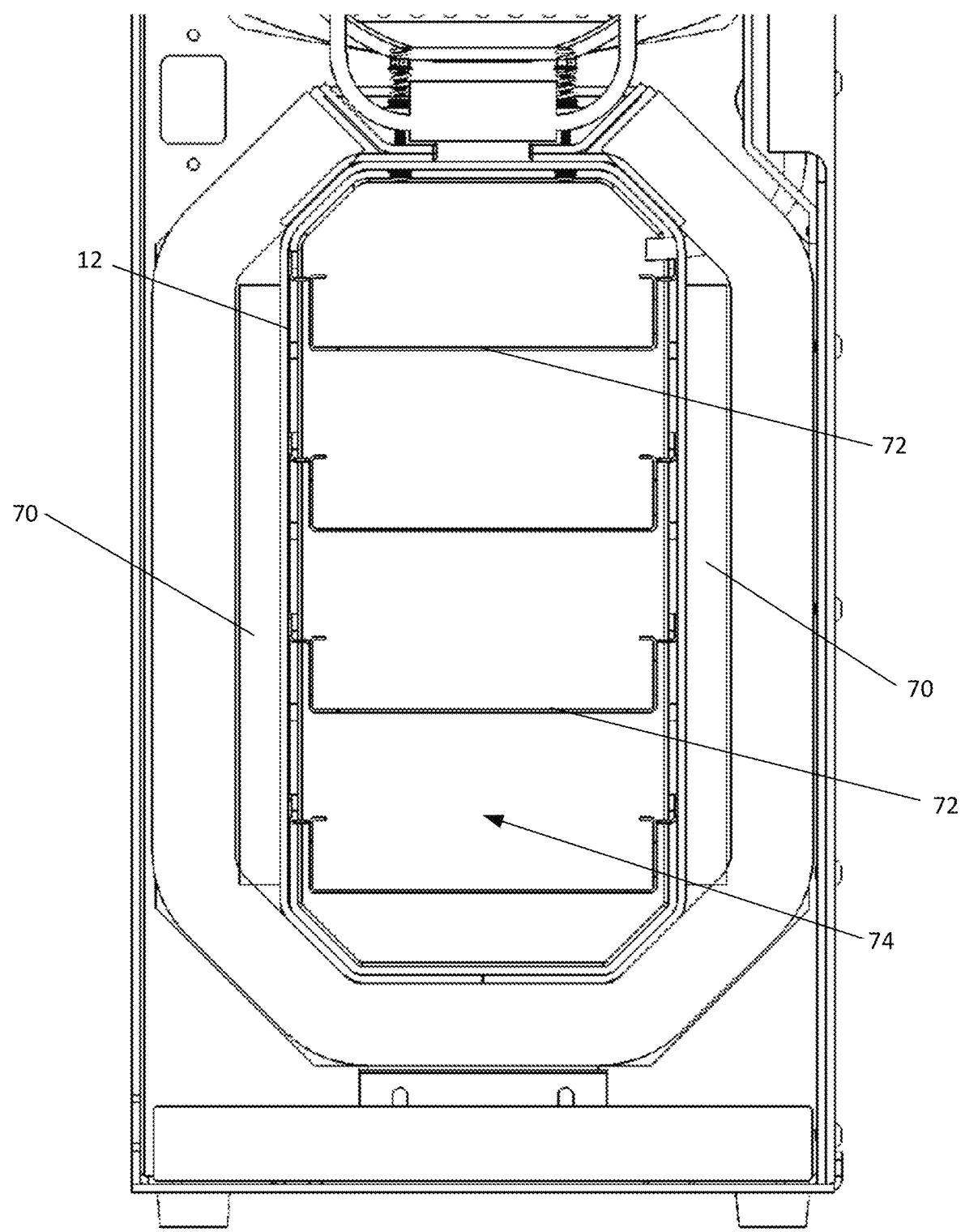

FIG. 4a shows the thermoelectric module 68 mounted to the external side of the insulated container 12. The top of the insulated container 12 is composed of a metallic material such as aluminum to promote good conduction of the cooling effect of the thermoelectric module 68. This portion of the assembly is referred to as the cold plate 52 because it is on the side receiving cold from the thermoelectric module 68. FIG. 4b shows the heat exchanger assembly 50 and its attendant parts. The thermoelectric module 68, or TE module, is put in contact with the cold plate 52 of the insulated container 12 through use of a module mounting frame 64, module mounting posts 66, and module mounting brackets 62 for use in compressing the TE module 68 firmly against the cold plate 52 on the top of the insulated container 12. This assembly of the TE module 68 is often performed with a thermal paste to better assist in the conduction of heat energy away from the cold plate 52 and to the side of the hot plate 58 which is disposed in contact with, and on top of, the TE module 68.

FIG. 4b also shows the top side of the TE module in contact with the hot plate 58 that is connected via heat pipes 60 of highly conductive material to be in contact with the heat exchanger 56 at the top of the system. This heat exchanger assembly 56 is of a design especially suited for conducting large amounts of heat away from a relatively small area in an efficient and solid state manner whereby there is no movement of the hot plate 58 or the heat pipes 60 during normal operation save the possible changing in size of the components due to rapid increases in temperature. The heat exchanger 56 at the top of the assembly is run through by the heat pipes such that heat conducted away from the hot plate 58 is exhausted into the heat exchanger 56 which is in turn cooled by a top mounted exhaust fan 54 that sucks the heat out of the heat exchanger 56 and sends it away from the portable refrigeration unit 10.

FIGS. 5a through 5e illustrate that the internal space 74 or chamber of the insulated container 12 can have one or more shelves 72. The shelves 72 can oriented parallel with respect to each other and horizontal. The shelves 72 can be slidably extended and removed from the internal space 74. The shelves 72 can be locked into place inside of the internal space 74.

The refrigerator unit 10 can have cold packs 70 attached to the outside surface of the insulated container 12. The cold packs 70 can each have a reservoir filled with 350 g of phase-change material (e.g., PCM-OM06P from RGEES, LLC of Arden, N.C.). The phase change material can change phase at 5.5 C. The cold packs 70 can have high latent heat storage and can be safe to make contact with the temperature-sensitive load.

The cold packs 70 can be rectangular, and can be attached to the sides, top, bottom, back, or combinations thereof of the insulated container 12. The cold packs 70 can be attached to the insulated door 14. The cold packs 70 can be slidably removed from the refrigerator unit 10. For example, warmer cold packs can be swapped for colder cold packs.

Figure 6:
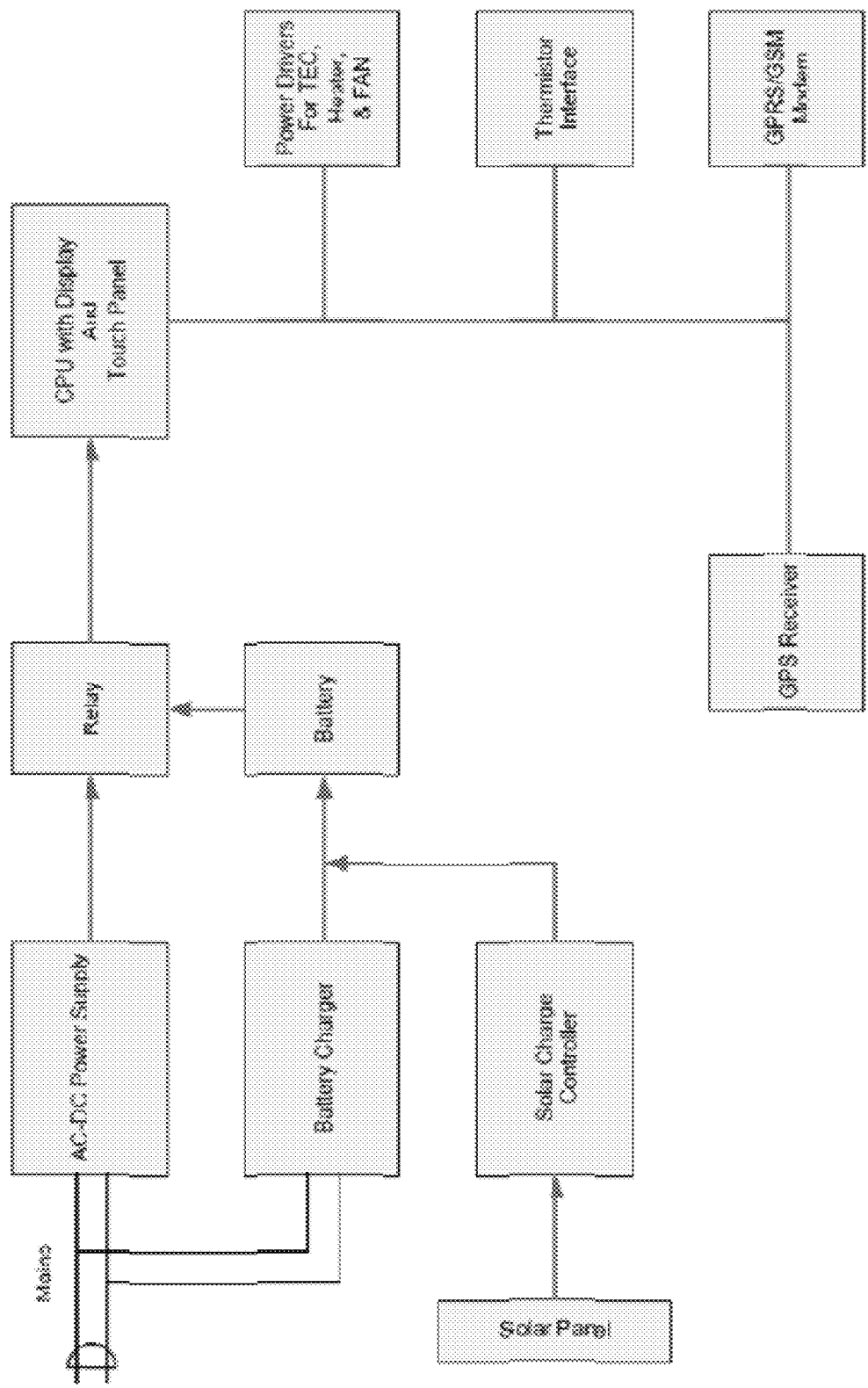
FIG. 6 provides an electrical schematic representative of the various electrical components in the system, their relation to each other, the connections between the components, and their relative functional roles in the system.

FIG. 6 shows the electronic components of the system and their function in a schematic layout representative of their connections and relative functionalities. The block diagram shows the AC mains inlet leading to the AC-DC power supply and converter. This component can provide DC power to the system through a relay. The AC mains can also be connected to a battery charger that charges the battery pack. The battery can then in turn provide DC power to the system through the relay. When the photovoltaic solar panel is connected and generating electricity, it can feed DC power into the solar charge controller which in turn can charge the battery. The battery then can run DC power to the system through the relay the same as when charged from AC mains.

The microcontroller central processing unit (CPU) can control the logic of the system and distributes the DC power to the system level components including the thermoelectric module 68, the resistance heater, and the exhaust fan 54. The microcontroller also sends small DC voltages to the thermistors which read the temperature of the interior of the insulated container 12 and the ambient external temperature. The microcontroller is also connected to the communications module which includes a GPS receiver to determine global position via satellite and the GPRS/GSM modem that provides connectivity to the internet and cloud based servers that support the data acquisition aspects of the devices functionality.

The electronic system design for the portable refrigeration unit 10 is based on a PIC24EP processor which can have a 320×240 TFT color display with touch panel. This provides the user interface for the unit and also monitors and controls the heating or cooling of the chilled chamber. The presence of the TE module 68 allows for cooling of the insulated container 12. The likely addition of a small resistance heater in the insulated container 12 also means that the system can be used to heat the contents enough to avoid any risk of freezing the contents.

Power MOSFETS connected to IO pins on the processor provide control for the thermoelectric module 68, a resistive heater, and the fan.

The temperature of the chilled chamber and the TE module heat sink are monitored with NTC thermistors connected to analog inputs on the processor. The resulting voltages are converted with the on-board Analog to Digital Converter (ADC) and the actual temperatures are calculated using the standard Steinhart-Hart algorithm and displayed.

The temperatures are sampled routinely and as an example at the rate of once per second and averaged by the firmware over a time range which could be 8 seconds.

The firmware is based on a periodic interrupt in the range of 1-100 times per second. In the case where it is 20 times per second as an example, this divides each second into 20 time slots. The various processor tasks are allocated to different time slots to even out the load on the processor and to allow for better power management. On each interrupt, the touch panel is sampled to determine if the user has made any inputs to the system.

Temperature control can be done with a simple on/off thermostat type of algorithm with a hysteresis of 0.1 C. The user has control of the set-point via a menu selection. The default could be at any temperature but would likely be at 5 C. When the temperature is above the set-point minus the hysteresis, the TE module is turned on. When the temperature drops below that point, the TE module is turned off.

When the temperature rises above the set-point plus the hysteresis, the TE module is turned on again. This cycle can take from 30 seconds to 10 minutes and can keep the chamber temperature within +0.3 and −0.1 C of the set-point as an example.

The TE module heat exchanger temperature can also be controlled via the fan. If the heat exchanger temperature rises above a set maximum, 40 C for example, the fan can be turned on until the temperature drops to a safer level, perhaps below 35 C. This cycle can take a period of time from 10's of seconds to several minutes, depending on ambient temperature.

The CPU can have features to support a GSM (cell-phone type) modem and a GPS receiver. The combination of these two interfaces will allow the portable refrigeration system to determine its location via the GPS receiver and then use the GSM phone interface to report the position and the status of the system to a server. This will allow for the remote management of any number of portable refrigeration systems in the field via the internet and cloud connected computer servers.

The refrigerator can keep the inside of the chamber below 10° C. without going below 0° C., or another desired temperature target or range. The user can select a desired temperature range of approximately 6° C. (2° C. to 8° C., for example), for example. The temperature measurement by a thermostat in the refrigerator can have a tolerance of about +/−1° C.

The CPU can control the set-point of the temperature. The CPU can change the set-point of the temperature in the chamber depending on the power source or sources for the refrigerator and the desired temperature range. For example, if the refrigerator is running on mains power, the CPU can set the chamber temperature set-point at a temperature near the lower end (e.g., at 25% from the bottom of the range) or at the bottom of the selected temperature range. The chamber contents can then be chilled as much as possible so that when mains power is disconnected, the contents of the refrigerator have to warm up farther to exit the top of the desired range. This can result in a longer total run time.

If the refrigerator is running on battery power, the CPU can set the chamber temperature set-point to a temperature near the upper end of the selected temperature range (e.g., 75% from the bottom of the range). Battery power usage can be proportional to the difference between the internal and external temperature of the device, so allowing the internal temperature to rise can reduce the power drawn from the battery, extending the battery life.

When the refrigerator is powered by mains power, the internal battery can be charged at a high rate that can recharge the battery in approximately 4 hours. If the only external power available is solar power, the CPU can control the battery charge rate by reducing it from the rate during mains power connection to a level which the solar panel can support. This can depend on the orientation of the panel relative to the sun as well as the season, time of day, and atmospheric transparency, directly detected by sensors delivering the aforementioned data to the CPU, or merely by the CPU measuring input voltage from the solar panels. In this situation, the chamber temperature set-point can be set by the CPU as though running on battery power.

The power conditions can be checked by the CPU at least once per second and the internal settings can be adjusted accordingly.

FIG. 7 is a table of exemplary performance specifications for the refrigerator.

Figure 8:
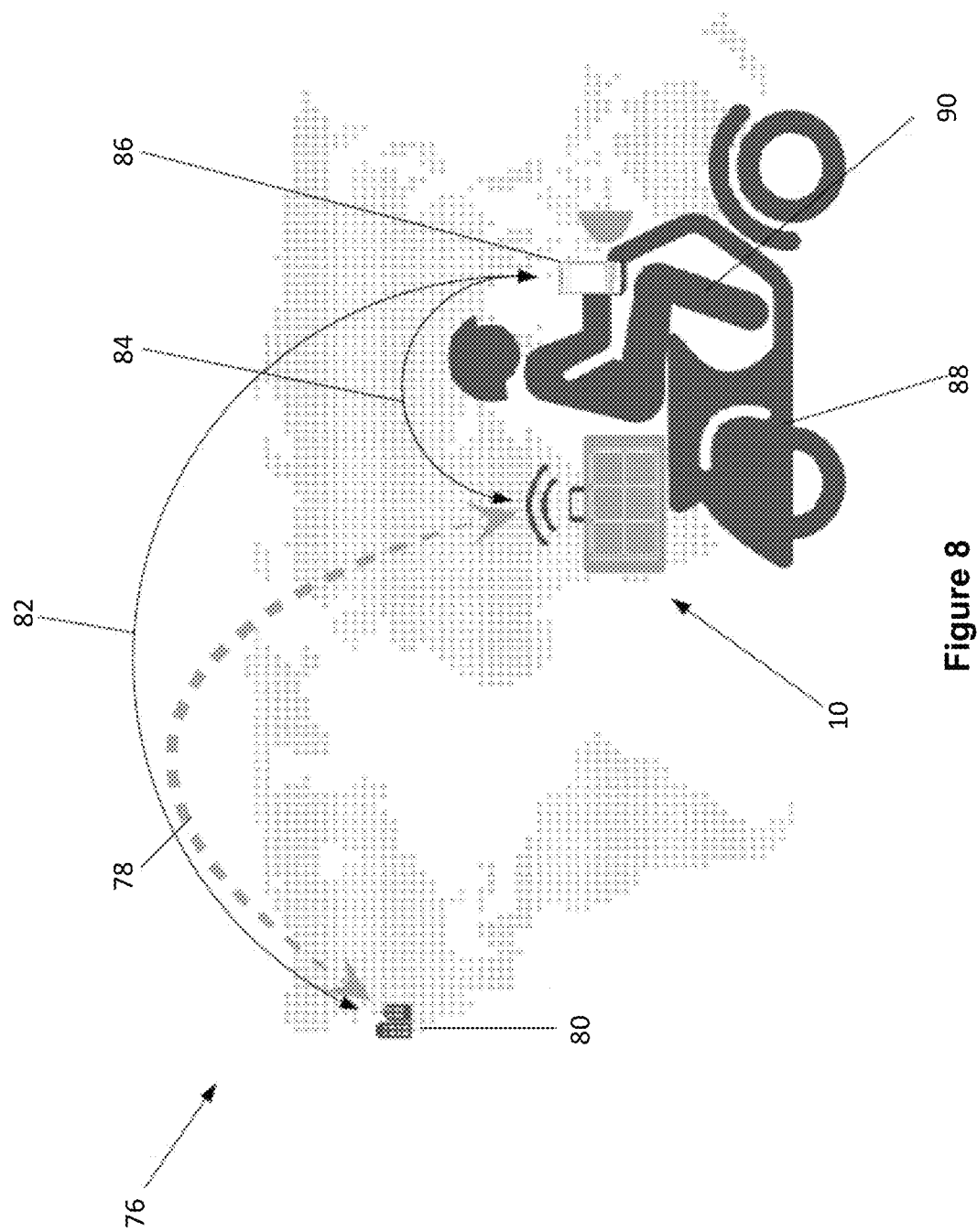
FIG. 8 is a schematic network diagram of a variation of the refrigeration unit management system overlaid on a map illustrating approximate exemplary geographical locations of the components of the system.

FIG. 8 illustrates that a refrigeration unit management system 76 can have the portable refrigeration unit 10, a remote computer 80, a runner computer 86, or combinations thereof. The remote computer and/or runner computer can each be one or more servers, desktop or laptop computers, mobile devices such as smartphones, tablets, PDAs, barcode scanners, or combinations thereof.

The portable refrigeration unit 10 can be in data communication with the remote computer over a remote-to-refrigerator connection 78. The runner computer 86 can be carried by a runner 90 or in a vehicle 88 carrying the portable refrigeration unit 10. The runner computer 86 can be in data communication with the remote computer 80 over a remote-to-runner connection 82. The portable refrigeration unit 10 can be in data communication with the runner computer 86 over a runner-to-refrigerator connection 84. Any of the connections can be through local area networks, wide area networks, wifi, Bluetooth, cell-phone type connections (e.g., GSM), infrared, optical (e.g., bar code scanning), or combinations thereof.

The remote computer 80 and/or runner computer 86 can receive and/or request data from the portable refrigeration unit 10 including the current and/or historical temperatures of the internal space of the unit and/or the ambient temperature outside of the unit (e.g., the unit can have digital thermometers inside and/or outside of the unit communicating with the CPU in the unit that can send out the temperatures to the remote and/or runner computers), the location of the unit, the items and their sizes stored in the unit (e.g., this can be entered manually into the unit's memory and/or determined by an optical scanner inside of the internal space, scanning the internal space and using image recognition software, and/or merely sending the image itself as a visual log of the contents of the internal space), or combinations thereof.

The remote computer 80 and/or runner computer 86 can send data to the refrigeration unit 10 to adjust the unit settings (e.g., to extend battery life by increasing the temperature inside of the internal space, and/or reducing the duty cycling frequency of the unit).

The remote computer 80 and/or runner computer 86 can send a message to the runner computer 86 to ask the runner to stop delivery to plug in the unit to a power source or expose the solar panels to the sun or another light source, for example when the remaining power in the batteries is below a level needed to reach the expected destination based on the current power load, speed of travel of the unit (based on the GPS readings), and length of travel remaining to destination, and also to alert the runner computer if there is a malfunction with the unit (e.g., from an unexpectedly high or low internal space temperature).

Figure 9:
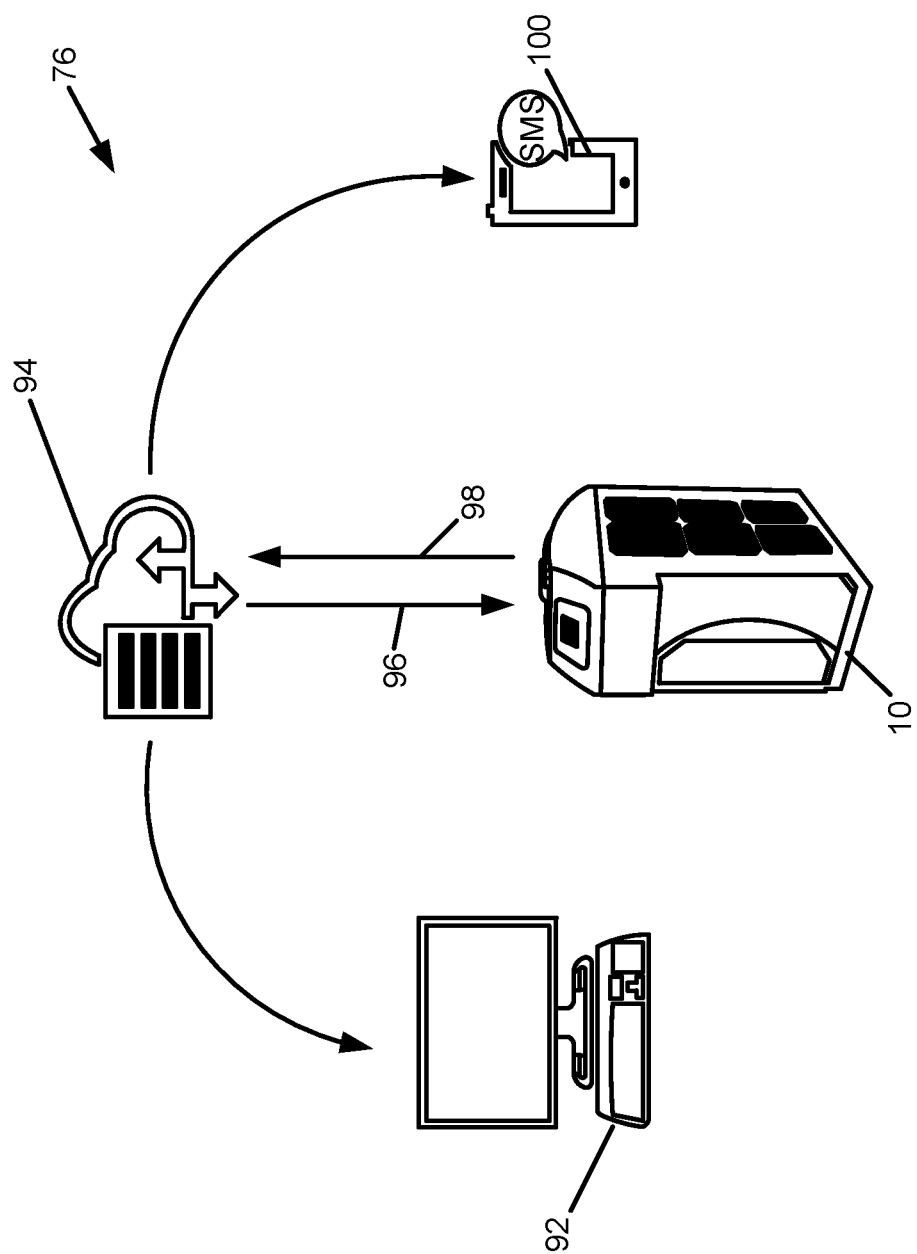
FIG. 9 is a schematic drawing of a variation of a networked refrigeration unit management system.

FIG. 9 illustrates that the portable refrigerator unit 10 can be in a networked refrigeration system. The system can have nodes such as remote nodes, such as a server (e.g., a cloud server), supply manager terminal 92, healthcare technician terminal 100, and the local nodes such as the refrigerator unit 10, or combinations thereof. The nodes can all be in data communication with each other directly or indirectly, for example over the Internet through the cloud server 94. The terminals can be desktop computers, laptop computers, handheld devices (e.g., tablets, smartphones), or combinations thereof.

The refrigerator unit 10 can communicate (e.g., via satellite and/or the GPRS/GSM modem, and/or a direct, wired Ethernet connection) with the cloud server 94. The unit can upload unit upload data to the cloud server 94. The unit upload data 98 can include, for example, location data including the present location and previous locations or path, battery charge level, internal temperature, external temperature, desired route, serial information to identify the unit and/or the driver/courier, manually entered notes (e.g., information entered by the driver regarding local environmental conditions), desired/preset internal temperature maximum, minimum, and/or temperature range, or combinations thereof.

An algorithm executing on a processor of the unit and/or cloud server, and/or another node in the system, can calculate the remaining distance range of the unit based on the location, desired route, battery charge, internal temperature, external temperature, and desired internal temperature maximum, minimum, and/or temperature range, or combinations thereof. (This calculation can also be performed by the algorithm on the unit itself.) The algorithm will calculate the estimated time the remaining battery charge can keep the internal temperature of the unit within the desired temperature range (e.g., including below the maximum temperature or above the minimum temperature), and then can estimate a distance range for the unit based on the projected speed of the unit. The cloud server 94 can download unit download data 96 to the unit including the distance range, and whether or not the unit is expected to arrive at a desired target location or endpoint before the internal temperature of the unit is no longer within the desired range, maximum, or minimum.

The cloud server 94 (or the other nodes) can distribute any of the data disclosed herein to any of the nodes through a web interface, via e-mail, via text or SMS message (as shown for the healthcare technician interface), via automated voice messages as attachments with the aforementioned methods or via voice lines, or combinations thereof.

FIGS. 10, 11a through 11c, and 12a through 12c illustrate that the user interface screen 20, remote computer 80, runner computer 86, or combinations thereof, can display information provided by the unit and/or calculated by any of the nodes. The user interface screen 20 can be accessed and viewed on the unit and/or on any of the nodes.

Figure 10:
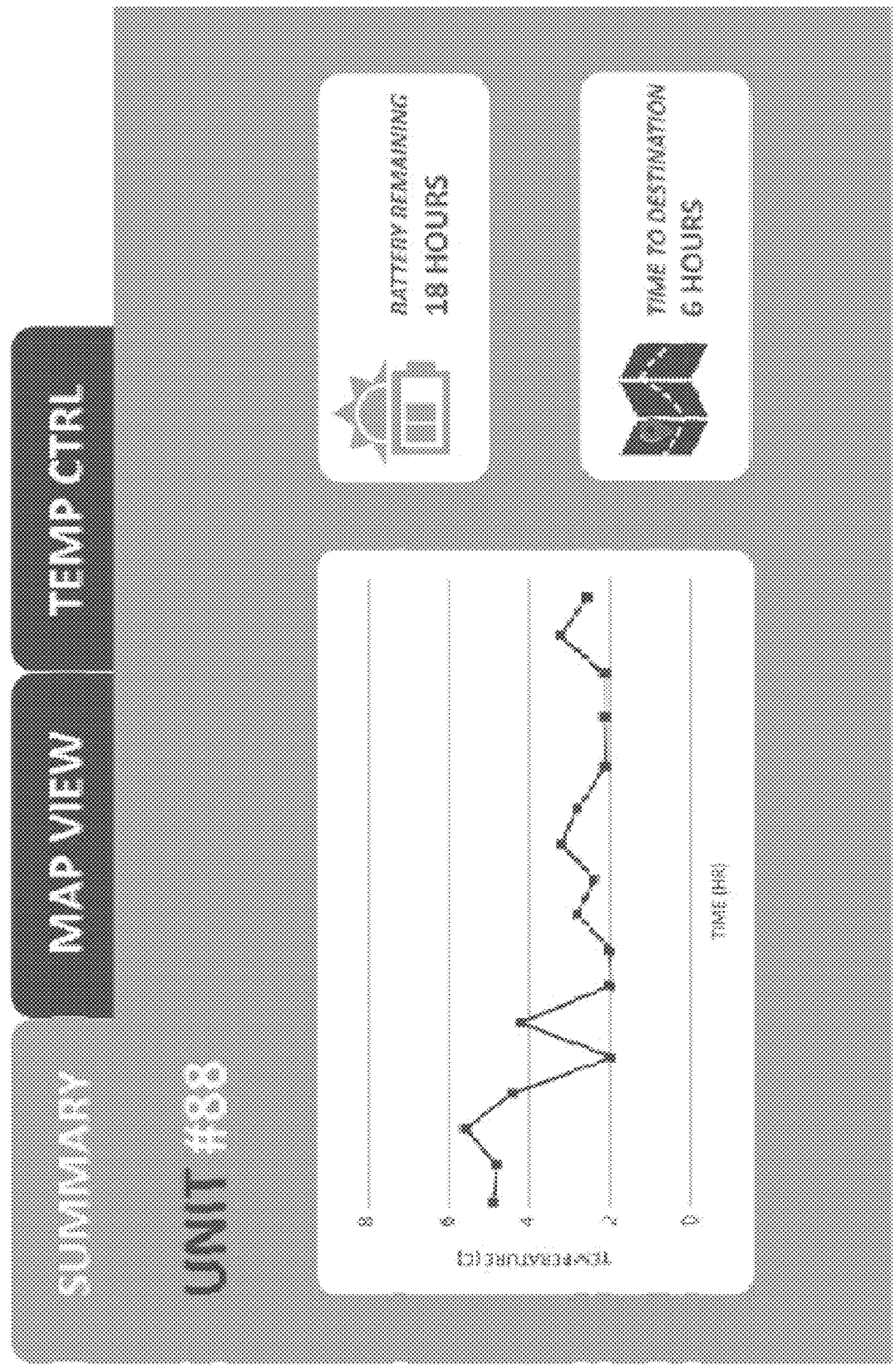
FIG. 10 illustrates a variation of a summary display for the unit interface screen, remote computer, runner computer, or variations thereof.

FIG. 10 illustrates that the display can be or have a summary display, screen or page. The summary page can show of the internal unit temperature with respect to time. The summary page can show the expected remaining operable time of the batteries. The operable time can be the remaining time for which the batteries can power the unit to keep the internal space below a desired temperature based on the remaining charge of the batteries. The summary page can show an expected time remaining to the delivery destination 106 for the unit.

Figure 11A:
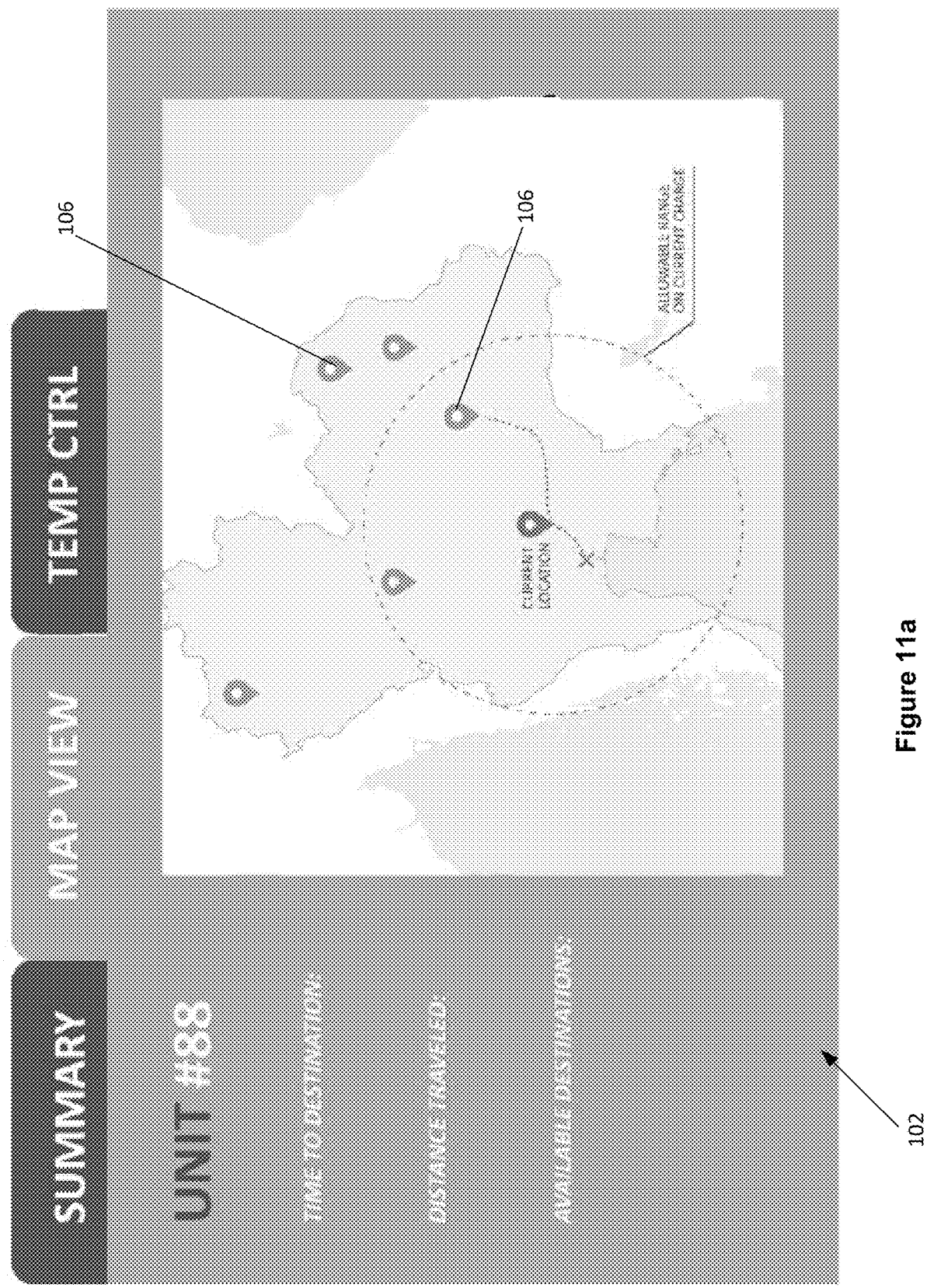
FIGS. 11a through 11c illustrate variations of a map display for the unit interface screen, remote computer, runner computer, or variations thereof.

FIG. 11a illustrates that the display can be or have a map display 102, screen or page. The map display 102 can illustrate a map showing the current location 104 of the unit, the path including the starting location of the unit, the desired destinations 106 for the unit, the estimated allowable range for the unit, and a projected path to a desired destination 106 (e.g., a desired destination within the allowable estimated unit range). The allowable range can be the distance that the system calculates that the unit can travel based on the battery charge, desired internal temperature, external temperature, projected speed, and combinations thereof.

Figure 11B:
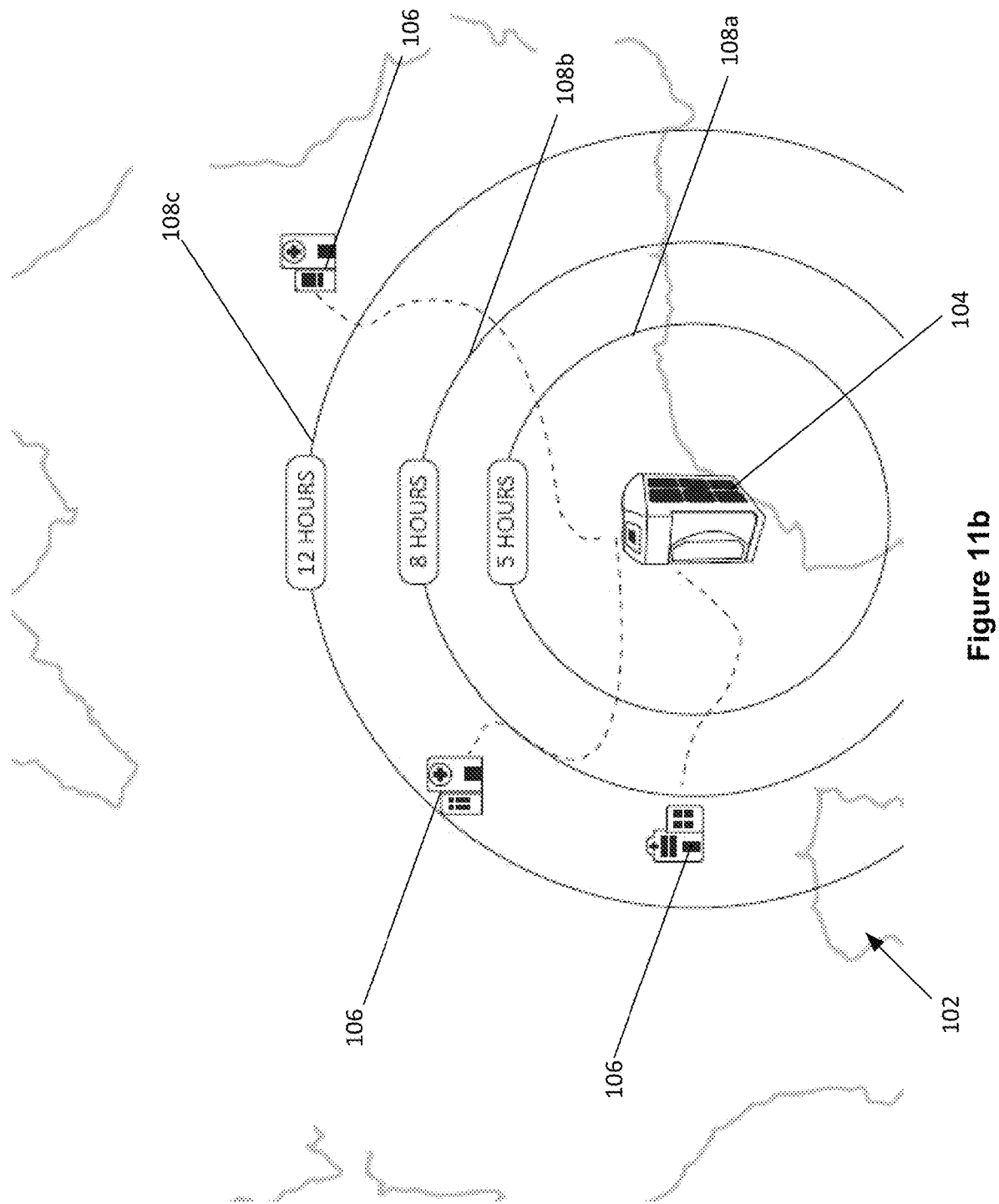

FIG. 11b illustrates that the map display 102 can display various estimated allowable ranges based on different levels of battery charges. For example, a first allowable range 108a can be shown if the battery has five hours of charge remaining based on the other data available. A second allowable range 108b can be shown if the battery has eight hours of charge remaining based on the other data available. A third allowable range 108c can be shown if the battery has twelve hours of charge remaining based on the other data available. The projected ranges can inform the runner or other users on the possible desire for additional charging of the battery to extend the range to a particular desired destination.

Figure 11C:
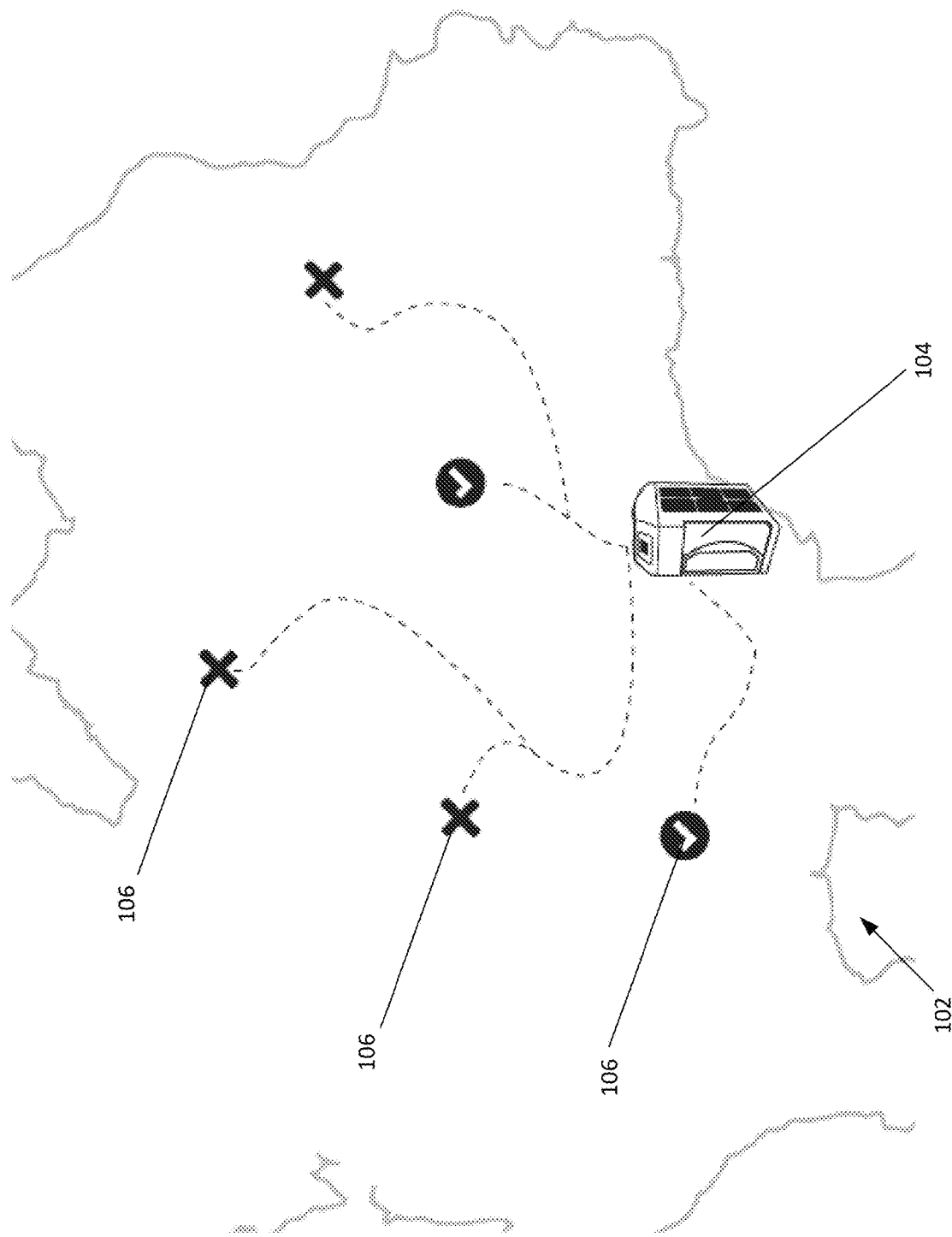

FIGS. 11a and 11b illustrate that the allowable range can be estimated as circles defining constant radii away from the current location of the unit. FIG. 11c illustrates that the system can calculate the allowable ranges 108a-c based on expected speed and distance along particular routes, rather than as a constant radius. The system can calculate which desired destinations 106 are within the allowable range (e.g., with check marks), and which desired destinations are not within the allowable range (e.g., with crosses or "X"s) based on the current battery charge and other data.

Figure 12A:
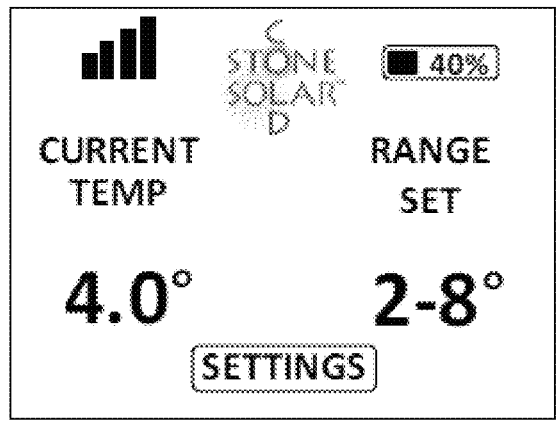
FIGS. 12a through 12c illustrate variations of temperature control displays for the unit interface screen, remote computer, runner computer, or variations thereof.

FIG. 12a illustrates that the display can be or have a first temperature control display, screen or page. The first temperature control page can show the current internal (inside of the internal space) and/or ambient temperature (around the outside) of the unit, the desired temperature range of the internal space, the strength of the network communication connection, the percent of battery charge remaining, or combinations thereof. The first temperature control page can have a button (e.g., "SETTINGS") to advance to the second temperature control page.

Figure 12B:
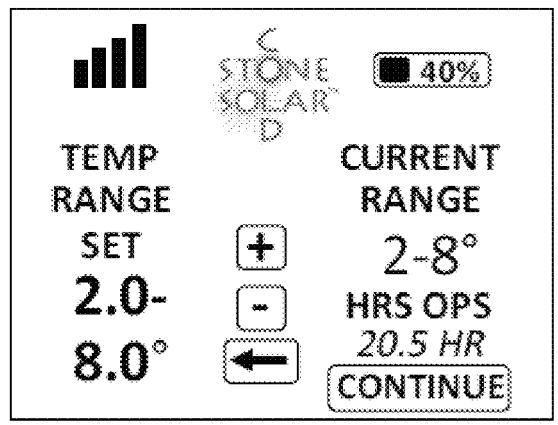

FIG. 12b illustrates that the display can be or have a second temperature control display, screen or page. The second temperature control page can show the hours of operation of the unit thus far in the trip (e.g., "HRS OPS") which can be manually or automatically reset before each trip begins, the currently set temperature range, controls for adjusting the temperature range (e.g., "+" and "−", for increasing and decreasing, respectively, the temperature by a single degree), the newly set temperature range, the strength of the network communication connection, the percent of battery charge remaining, or combinations thereof. In the second temperate control page, the user can modify the desired temperature range for the internal space. The second temperature control page can have a button (e.g., "CONTINUE") to advance to the third temperature control page.

Figure 12C:
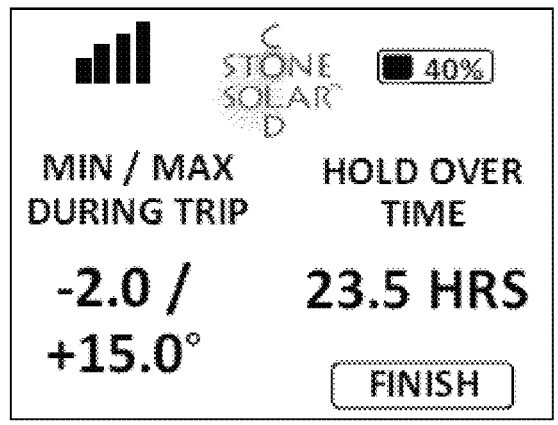

FIG. 12c illustrates that the display can be or have a third temperature control display, screen or page. The third temperature control page can show the maximum and minimum temperatures experienced by the internal space since the beginning of the trip for the unit (e.g., the maximum and minimum trip temperatures can be manually or automatically reset before departing for each trip), a hold over time (i.e., the expected remaining operable time of the batteries to keep the internal space within the desired temperature range), the strength of the network communication connection, the percent of battery charge remaining, or combinations thereof.

The display can cycle automatically and/or manually through the first, second, and third temperature control pages.

The variations above are for illustrative purposes and it will be apparent to those skilled in this art that various equivalent modifications or changes according to the idea of and without departing from the disclosing and teaching herein shall also fall within technical scope of the appended claims. For example, any of the materials disclosed herein can be used to make any of the elements.

Systems and methods that have elements that can be used in combination with the disclosure herein include those taught in U.S. Pat. Nos. 6,929,061, 7,728,711, 8,026,792, 8,280,550, 9,182,155, and U.S. Patent Pub. Nos. 2009/0139248, 2012/0036869, 2015/0143823, all of which are incorporated by reference herein in their entireties.

Any elements described herein as singular can be pluralized (i.e., anything described as "one" can be more than one), and plural elements can be used individually. Any species element of a genus element can have the characteristics or elements of any other species element of that genus. The term "comprising" is not meant to be limiting. The above-described configurations, elements or complete assemblies and methods and their elements, and variations of aspects thereof can be combined and modified with each other in any combination.

We claim:

1. A refrigeration unit system comprising: a system housing having a front panel, a back panel, two side panels, a bottom panel, and a bezel having an air exhaust at a top of the system housing; a detachable photovoltaic panel assembly comprising photovoltaic cells on one or more of the two side panels; a plurality of air intake slots on the back panel; an assembly having a cold chamber central to the assembly, the assembly comprising a thermoelectric module affixed to the chamber in direct contact, wherein the module is configured for conduction of a heat away from the cold chamber, wherein the cold chamber comprises a shelf removable from the cold chamber, wherein the cold chamber comprises cold packs attached to an outside surface of the cold chamber; insulation surrounding the cold chamber and arrayed so as to create a sealed and insulated environment; a heat flow system comprising a heat exchanger, a cold plate, and a heat conducting plate, wherein the heat exchanger comprises fins to cool the refrigeration unit system, wherein the heat conducting plate and the heat exchanger are connected via heat pipes configured to conduct the heat away from the heat conducting plate to the heat exchanger, wherein the heat exchanger releases air through the air exhaust, wherein the thermoelectric module is in mechanical contact with the heat conducting plate and the cold plate, wherein the thermoelectric module is mounted to the cold plate by a mounting frame, wherein the thermoelectric module is compressed against the cold plate, wherein the heat conducting plate is between the cold plate and the heat exchanger, wherein the cold plate is between the cold chamber and the thermoelectric module; thermal probes attached to the cold chamber, the heat exchanger, and exposed to an ambient environment having an ambient temperature, wherein the probes are configured to monitor system temperature states;

a system microprocessor, wherein the system microprocessor monitors the system temperature states and performs a cooling algorithm based on the system temperature states when the refrigeration unit system is powered by a rechargeable battery in the system housing, wherein the system microprocessor sets a target temperature near an upper end of a selected temperature range when a mains power is not connected to a mains power connector, and wherein the system microprocessor sets the target temperature near a lower end of the selected temperature range when the mains power is connected to the mains power connector;

a first remote computer in satellite data communication with the refrigeration unit, wherein the first remote computer receives data of a location of the refrigeration unit, a battery charge level of the refrigeration unit, the selected temperature range, an internal temperature inside of the refrigerator unit, and the ambient temperature outside of the refrigerator unit, wherein the first remote computer calculates a remaining time of operable life of the refrigerator unit using the data of the internal temperature inside of the refrigeration unit and the ambient temperature outside of the refrigerator unit, wherein the operable life comprises an amount of time the unit has left wherein the cold chamber will remain below the upper end of the selected temperature range, wherein the refrigeration unit system is configured so the first remote computer adjusts settings of the refrigerator unit based on the operable life, and wherein the first remote computer is configured to send a distance range and whether the refrigeration unit is expected to arrive at a desired target before the internal temperature of the refrigeration unit is no longer within the selected temperature range to a second remote computer; and the second remote computer in data communication with the first remote computer, wherein the second remote computer is separate from the refrigeration unit and in a vehicle in which the refrigeration unit is in, and wherein the second remote computer is in data communication with the refrigeration unit, and wherein the second remote computer is configured to receive data of the internal temperature inside of the refrigeration unit and items inside the unit and sizes of the items inside of the unit.

2. The system of claim 1, wherein the cold chamber comprises a metal.

3. The system of claim 2, wherein the metal comprises aluminum sheet metal.

4. The system of claim 1, where the insulation is comprised of vacuum insulated panels.

5. The system of claim 2, wherein the insulation comprises vacuum insulated panels formed to contours of the cold chamber and sealed at edges with closed cell foam or polymer tape.

6. The system of claim 1, wherein the algorithm runs the thermoelectric module by pulsing the refrigeration unit system between on and off states.

7. The system of claim 1 where the system microprocessor can sense a connection of the system to AC mains power and simultaneously charge the battery while running the thermoelectric module in order to cool the cold chamber.

8. The system of claim 1, wherein the refrigeration unit comprises an optical scanner configured to scan inside of the refrigeration unit.

* * * * *